United States Patent [19]

Sakata et al.

[11] 3,751,581

[45] Aug. 7, 1973

[54] COLOR TELEVISION STANDARD SYSTEM CONVERTING EQUIPMENT

[75] Inventors: Haruo Sakata; Hiroshi Tanimura; Ryuichi Kaneko; Hideo Kusaka, all of Tokyo; Eiichi Sato, Sagamihara; Tokuji Kubo, Tokyo, all of Japan

[73] Assignee: Nippon Hoso Kyokai, Tokyo, Japan

[22] Filed: Oct. 18, 1971

[21] Appl. No.: 190,216

Related U.S. Application Data

[63] Continuation-in-part of Ser. No. 818,341, April 22, 1969, abandoned.

[52] U.S. Cl. ........................ 178/5.4 C, 178/DIG. 24
[51] Int. Cl. ............................................ H04n 9/42
[58] Field of Search .................. 178/5.4 C, DIG. 24

[56] References Cited

OTHER PUBLICATIONS

NHK Laboratories Note Serial No. 111 "Television Standards Converter Using Delay-Line System," H. Sakata et al. Aug. 1967.

"Field-Store Standards Conversion," W. Wharton et al., Proc. IEE, Vol. 113, No. 6, June 1966, pp. 989–996.

*Primary Examiner*—Robert L. Griffin
*Assistant Examiner*—George G. Stellar
*Attorney*—Stevens, Davis, Miller & Mosher

[57] ABSTRACT

A system for converting color television signals from one standard system having a certain number of scanning lines and fields to a second standard system having a different number scanning lines and of fields, comprising the steps in a sequence of; line interpolation, line length compensation, line number conversion, field setting, field number conversion, time error compensation, interlace interpolation and field interpolation or in a sequence reverse thereto while using the SECAM type signal.

Most of the equipment used in each of the above steps are so constructed that the SECAM type composite color signal may be processed without modifying the signal in order to simplify the system. The respective equipment comprises delay lines as the main constructive elements to stabilize the operation. In order to effectively utilize the delay element the desired interpolated signal is formed in the frequency domain by a combining means by using a frequency modulated signal, and by means of the same the discontinuity of the picture which will be or has been accompanied with the conversion of the number of lines or number of fields is compensated.

10 Claims, 18 Drawing Figures

COLOR TELEVISION STANDARD SYSTEM CONVERTING EQUIPMENT

CROSS REFERENCE RELATED APPLICATIONS

This application is a continuation-in-part application of Ser. No. 818,341 filed on Apr. 22, 1969 now abandoned.

BACKGROUND OF THE INVENTION

According to the recent development and popularization of television broacasting among countries in all parts of the world, the demand for international transmission of television program signals becomes more and more ardent for the mutual understanding and the amity of nations. More especially the recent development of practical use of the communication satellite network affords a possibility of real time transmission of television signals between far distant nations and the importance of television program exchange among such nations has greatly increased.

On the other hand the television broadcasting systems used among various mations are not unified and various standard systems are used among various countries. In these different standards, even the basic scanning manner itself is different from each other, so that it is impossible to instantaneously exchange programs between different standard broadcasting systems. Accordingly, the need for the development of a converting equipment able to effect a real time conversion between different standards has increased rapidly for the program transmission between nations having different television broadcasting standards.

The present conversion system used in the European countries for the conversion of different television broadcasting standards is a system known as an image transfer system, which is based on a principle of photo-electric conversion, in which a picture of 1st standards is reproduced on a cathode-ray tube and a photograph of this picture is taken by a camera tube of a 2nd standard system so as tp produce a television signal of the 2nd standard. In such a photo-electric conversion system, flicker of the converted picture tends to occur especially in a conversion between systems having a different number of fields per second. In practice for minimizing such flicker effect, a cathode-ray tube having a long after image character is used for the reproducing tube of the 1st standards system. However, this in turn causes another disadvantage in that the resolution characteristic of the camera tube especially for a moving object deteriorates. Such known conversion systems have further disadvantages in the inferior linearity of converted signals, low quality of converted picture owing to distortion of the deflection and further deterioration of the resolution character owing to aperture character of the camera tube used in the conversion system.

Also a conversion system using a specially designed magnetic video recording device had been suggested, but this system has a disadvantage relating to the particular difficulty of realizing practical devices, such as a tape running system, head assembly and other constructive parts so that practical equipment according to this principle having a sufficient stability of operation is difficult to obtain.

SUMMARY OF THE INVENTION

The present invention relates to a system for converting a color television signal of one standard system into a color television signal of a different standard system, wherein a majority of the equipment comprising the system is used for both chrominance and luminance signals and is so constructed to process signals by switching the delay lines.

The first object of the invention is to realize a converting system being able to effect conversion between two color television signals belonging to different standard systems, wherein the simplification of the equipment is considered by forming the equipment usable for treatment of both chrominance and luminance signals.

The second object of the invention is to realize a converting system which, for the compensation of irregularity or discontinuity of the picture occurring at the time of conversion of line number anf field number, makes weighted addition of adjacent image signals by means of frequency adding means using the signal before conversion when an input signal having a larger number of lines or of fields is to be converted into a signal having smaller number of lines or of fields and using the signal after conversion when the conversion is effected in a reverse way thereto.

The third object of the invention is to realize practical converting equipment for producing the above-mentioned interpolated signal.

The fourth object of the invention is to realize a color television signal standard converting system based on a principle of switching delay lines which comprises delay lines as the main constructive elements of the respective equipment.

As a basic condition of the system of the invention, the input signal is the SECAM type signal. SECAM is an abbreviation of Séquential Couleur á Mémoire.

Accordingly, the PAL (Phase Alternation by Line) or NTSC (National Television System Committee type signal is to be converted into a different system, the signal is first converted to the SECAM type color television signal, and thereafter applied to the equipment of the present system.

In the present specification, it should be noted that the SECAM type color television signal means a composite color television signal having an FM chrominance signal made from frequency modulation of the sub-carrier wave by two chrominance signals R-Y and B-Y (wherein R is the red chrominance signal, B is the blue chrominance signal and Y is the luminance signal, respectively) and which is superposed on the luminance signal in line sequentially.

The system of the present invention comprises; a line interpolator for compensating for discontinuity of image which might occur by the conversion of line number, a line length compensator for compensating for the difference is length of the scanning lines between two different color television standards, a line converter for converting the number of lines, a field setter for compensating irregularity of time corresponding to one-half horizontal scanning lines caused by field number conversion so as to reproduce a correct interlace scanning, a field converter for converting the number of fields, a field interpolator for compensating for time discontinuity of the image caused by the field number conversion.

The above mentioned sequence of the equipment is used in a case of conversion of a standard system having 625 scanning lines per frame and 50 fields per second, which hereinafter will be referred to as 625/50 system, into a system having 525 scanning lines per frame and 60 fields per second, which hereinafter will be referred to as 525/60 system. In case of a conversion from 525/60 system into 625/50 system the sequence of the equipment is reversed thereto.

In other words, the sequence of the equipment of the system is so arranged that the line interpolation and field interpolation are effected so as to fully utilize the information which is to be deleted at the time of conversion of the line number and field number.

An essential feature of the present invention is that the main constructive equipment of the system of the invention excluding the line interpolator and field interpolator are constructed to be able to handle the SECAM type composite color television signal. This affords a great advantage compared with a system in which the chrominance and luminance signals are treated in separate systems in view of miniaturization and simplification of the converting device.

Another feature of the system of the present invention is to construct the main portion of the converting equipment by a principle of switching delay lines for the signal treatment.

The third feature of the system of the present invention is to construct each interpolator to make weighted addition in the frequency domain of the co-related two signals to obtain an interpolated signal by a weighted addition in a desired ratio.

For instance the FM interpolated signal is obtained by adding two signals in the frequency domain after applying frequency modulation to convert it into an FM signals and applying frequency multiplification and frequency step down in accordance with the rate of the weighted addition.

DESCRIPTION OF THE PREFERRED EMBODIMENTS

Now the invention will be described in detail with reference to the embodiments shown in the accompanying drawings.

Figure 1:
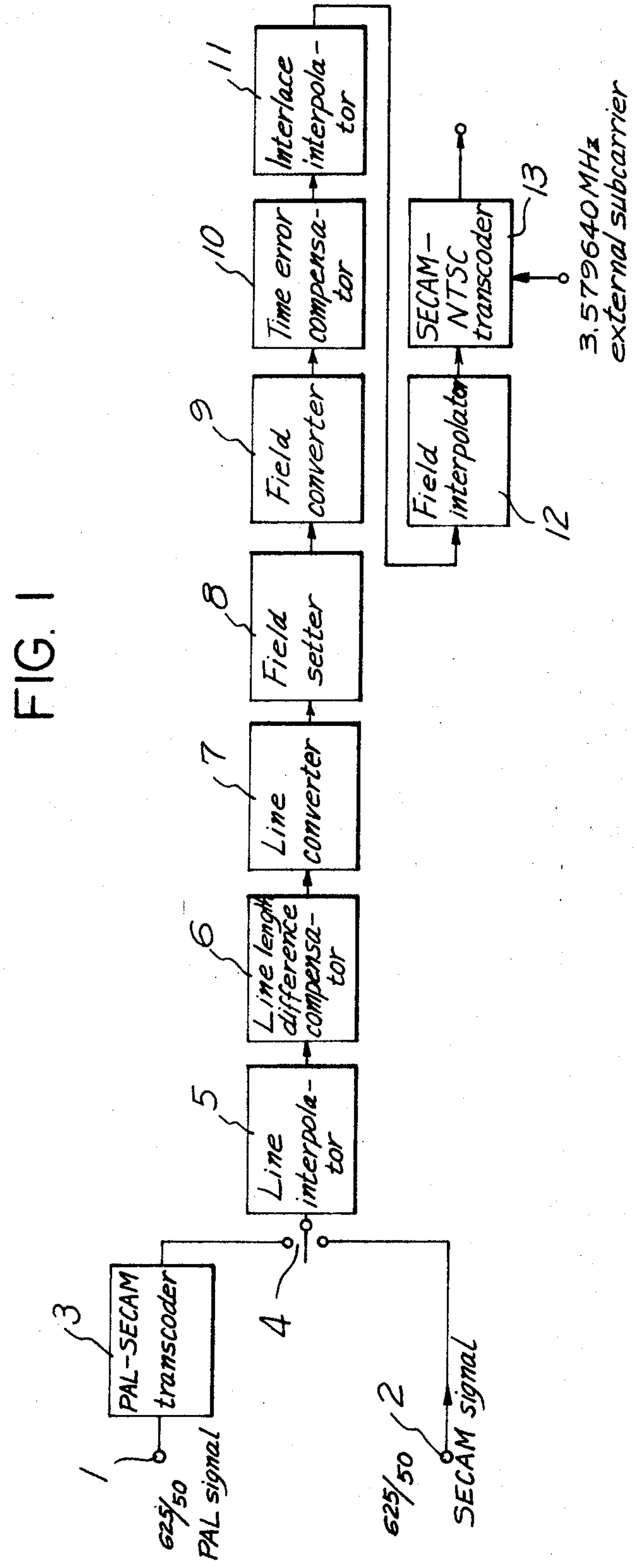
FIG. 1 is a block diagram of the system of the present invention wherein the 625/50 PAL or SECAM type signal is to be converted into the 525/60 NTSC type signal.

FIG. 1 shows a general construction of the converting equipment according to the invention for converting the PAL and SECAM signals of 625 lines/50 fields standards widely used in Europe into the NTSC signal of the 525 lines/60 fields standards mainly used in Japan and United States of America. Hereinafter, the conversion in this direction, i.e. the conversion from 625/50 standards to 525/60 standards will be referred as "forward conversion" and the conversion in the opposite direction, i.e. the conversion from 525/60 standards to 625/50 standards will be referred as "reverse conversion." Moreover, the color television signal to be converted is called a "first color television signal" and the converted color television signal is called a "second color television signal."

In case that the first color television signal to be converted is of the PAL system of 625/50 standards, this PAL color television signal is applied to an input terminal 1 shown in FIG. 1. The first color television signal of the PAL system is first converted into a color television signal of the SECAM system in a color sequence converter 3. In the color sequence converter 3, the PAL color television signal is once demodulated so as to produce luminance and chrominance signals and then these signals are applied to a SECAM encoder after a subcarrier component has been sufficiently attenuated. From the SECAM encoder, there is produced a 625/50 color television signal of the SECAM system in which frequency modulated color difference signals R-Y and B-Y are superimposed on the luminance signal as line sequential signals. The first color television signal thus converted into the SECAM system signal is supplied to a line interpolator 5 through a switcher 4.

In case that the first color television signal to be converted is of the SECAM system, it is applied to an input terminal 2 and then is applied to the line interpolator 5 through the switcher 4. As described above, in the converting equipment according to the invention, the color television signal of the SECAM system is used for carrying out signal conversion processes which will be explained hereinafter. By using the SECAM signal according to the present invention variation of hue can be maintained as little as possible.

Figure 2:
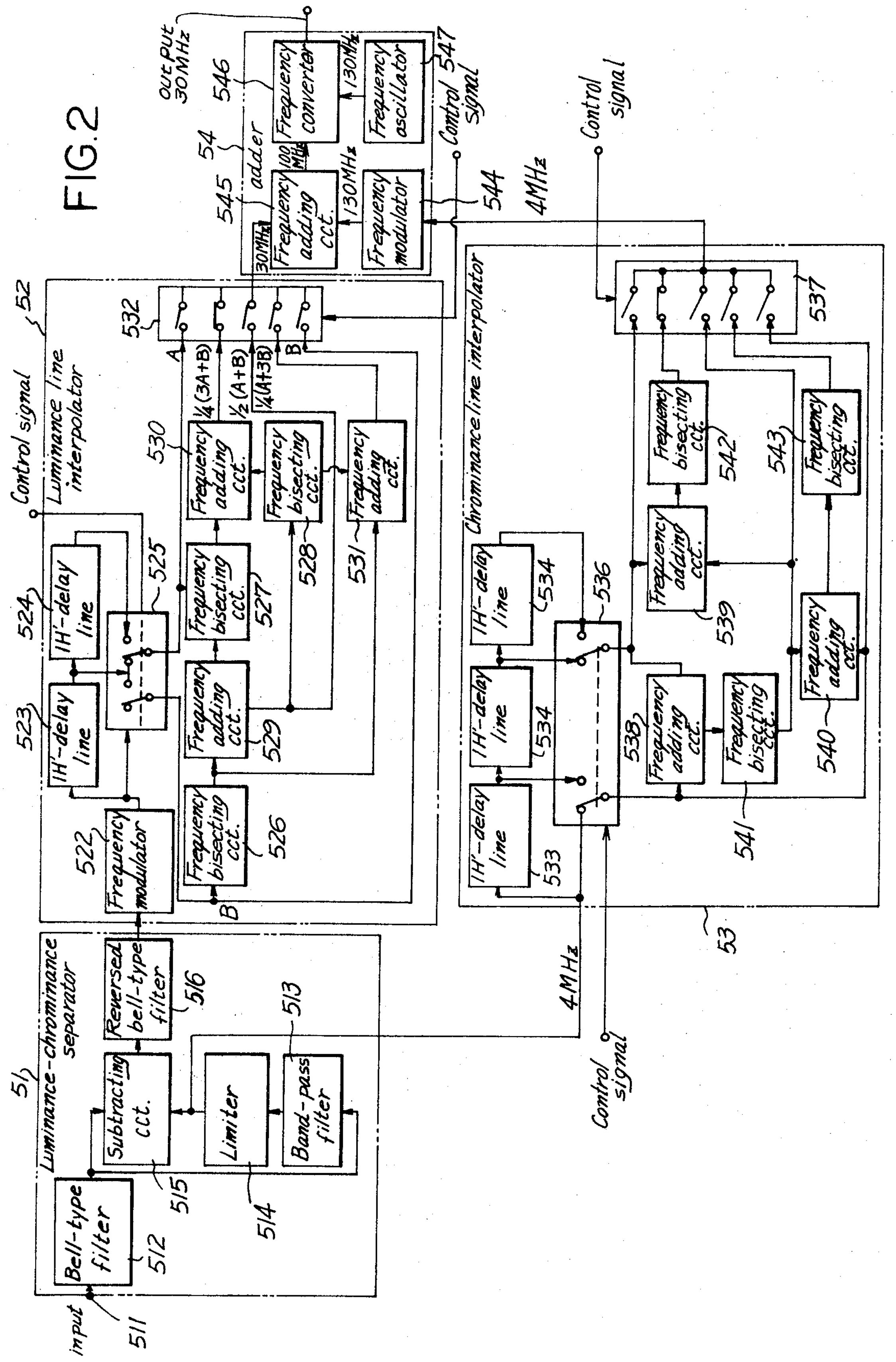
FIG. 2 is a block diagram showing an embodiment of the line interpolator.

The purpose of the line interpolator 5 is to compensate for discontinuity of an image which will result from a line deletion effected in a succeeding line converter 7. FIG. 2 shows an embodiment of the line interpolator 5.

In FIG. 2, a reference numeral 51 indicates a luminance-chrominance separator which separates the first color television signal of the SECAM system into the frequency modulated color difference signal (carrier chrominance signal) and the luminance signal. The first color television signal applied to an input terminal 511 is passed through a bell-type filter 512 having frequency characteristics of a bell shape and is then divided into two. One of the bifurcated signals is supplied to a band-pass filter 513 and then is supplied to a limiter 514 to produce the carrier chrominance signal. The other of the bifurcated signals is directly supplied to a subtracting circuit 515 to which the carrier chrominance signal from the limiter 514 is also supplied so as to produce the luminance signal. The luminance signal thus produced is supplied to a luminance signal line interpolator 52 through a filter 516 having frequency characteristics of a reversed-bell shape.

The luminance signal line interpolator 52 comprises a frequency modulator 522 having a carrier frequency of, for example, 30 MHz, two delay lines 523 and 524 each having a delay time equal to the horizontal scanning period H′ of the first color television signal and a switcher 525 operating at a given rate which is suitable for compensating for fluctuations in weight positions and deriving a pair of a non-delayed FM luminance signal from said frequency modulator 522 and a 1H′-delayed FM luminance signal from said 1H′ delay line 523 or a pair of a 1H′-delayed FM luminance signal and a 2H′-delayed FM luminance signal from said 1′H delay line 524. The luminance line interpolator 52 further comprises a plurality of frequency bisecting circuits 526, 527 and 528 and a plurality of frequency adding circuits 529, 530 and 531 for weighted addition at suitable ratios two FM luminance signals from said switcher 525 (for the sake of clarity, these two signals are denoted by A and B). These two signals A and B correspond to two successive lines in the picture to be converted. The luminance signal line converter 52 further comprises a switcher 532 for deriving the weighted signals successively at a given rate. The first switching element of the switcher 532 receives the signal A directly supplied from the switcher 525. The second switching element receives a signal ¼ (3A + B) from the frequency adding circuit 530 which receives a signal A/2 from the frequency bisecting circuit 527 and a signal (A/4 + B/4) from the frequency bisecting circuit 528 to which a signal (A/2 + B/2) is supplied from the frequency adding circuit 529 receiving signals A/2 and B/2 supplied from the frequency bisecting circuits 527 and 526, respectively. The third switching element of the switcher 532 receives the signal (A/2 + B/2) supplied from the frequency adding circuit 529. The fourth switching element of the switcher 532 receives a signal ¼(A + 3B) supplied from the frequency adding circuit 531 which receives the signal B/2 from the frequency bisecting circuit 526 and the signal ¼(A + B) from the frequency bisecting circuit 528. The fifth switching element of the switcher 532 receives the signal B directly supplied from the switcher 525.

The switcher 532 may comprise a plurality gate circuits serving as the switching elements and of a mixing circuit for combining output signals passed through the gate circuits. The switching elements are so composed that the above mentioned five signals A, ¼(3A + B), ½(A + B), ¼(A + 3B) and B may be selectively derived. The five switching elements are operated in the desired sequence by driving pulses relating to the horizontal scanning period H′ of the input first color television signal. The operation of the switchers 525 and 536 will be described in greater detail hereinafter.

Now the principle of the FM luminance signal line interpolation will be explained using mathematical equations. This principle is based on the fact that a signal $F(V_1+V_2)$ which is obtained by frequency-modulating an amplitude-added-signal of two signals $V_1(t)$ and $V_2(t)$ is equivalent to a signal which is obtained by adding in a frequency domain two frequency modulated signals $F(V_1)$ and $F(V_2)$ of two signals $V_1(t)$ and $V_2(t)$.

When two video signals $V_1(t)$ and $V_2(t)$ are added in amplitude, there may be obtained a signal $V(t)$ which may be represented as $$V(t) = V_1(t)+V_2(t) = a\cos(\omega_1 t+\theta_1)+b\cos(\omega_1 t+\theta_2) \quad (1)$$

When this amplitude-added signal $V(t)$ is frequency-modulated, the following FM signal $F(V)$ may be obtained;

$$F(V) = F(V_1+V_2) = C\sin[\omega t+\theta+K\{a/\omega_1\sin(\omega_1 t+\theta_1)+b/\omega_1\sin(\omega_1 t+\theta_2)\}] \quad (2)$$

When the signals $V_1(t)$ and $V_2(t)$ are frequency-modulated, the following FM signals $F(V_1)$ and $F(V_2)$ may be obtained;

$$F(V_1) = A\sin\{\omega_c t+\theta c_1+K_1 a/\omega_1\sin(\omega_1 t+\theta_1)\} \quad (3)$$

$$F(V_2) = B\sin\{\omega_c t+\theta c_2+K_1 b/\omega_1\sin(\omega_1 t+\theta_2)\} \quad (4)$$

When these FM signals $F(V_1)$ and $F(V_2)$ are combined in a frequency adder to produce a multiplied signal and then only the sum frequency component of the multiplied signal is derived by means of a filter, the following signal $F'(V_1+V_2)$ may be obtained;

$$F'(V_1+V_2) = C'\cos[2\omega_0 t+\theta c_1+\theta c_2+K_1\{a/\omega_1\sin(\omega_1 t+\theta_1)+b/\omega_1\sin(\omega_1 t+\theta_2)\}] \quad (5)$$

If the above equations (2) and (5) are compared, it will be understood that when $2\omega_c=\omega$, the signal $F'(V_1+V_2)$ is equivalent to the signal $F(V)=F(V_1+V_2)$. That is, when the two video signals are added in amplitude and then the amplitude-added signal is frequency modulated, there can be obtained the same signal as that obtained when the two video signals are at first frequency modulated and then the frequency modulated signals are added on a frequency axis.

Next the construction and operation of the chrominance signal line interpolator 53 will be explained in detail. The purpose of the chrominance signal line interpolator 53 is to obtain a line interpolated signal for the FM color difference signals supplied from the luminance-chrominance separator 51. The construction of the chrominance signal line interpolator 53 is similar to that of the luminance signal line interpolator 52 except for the following two points. The first point is that the chrominance signal line interpolator 53 comprises three 1H′ delay lines 533, 534 and 535 for obtaining 1H′, 2H′ and 3H′ delayed signals and a switcher 536 for deriving selectively pairs of non-delayed signal and 2H′-delayed signal, 1H′- and 3H′-delayed signals and the second point is that in order to decrease a fractional band width, the frequency combined signals of pairwised signals are passed through frequency bisecting circuits 541, 542 and 543. In the chrominance signal line interpolator 53, pair-wised signals derived from the switcher 536 are added in a frequency adding circuit 538 and the frequency of the frequency-added signal thus obtained is divided by 2 in the frequency bisecting circuit 541 so as to produce a signal being added with weighting at a ratio of 0.5/0.5. Each of the pair-wised signals and the signals derived from the frequency bisecting circuit 541 are added in frequency adding circuits 539 and 540, respectively and then the frequency of the added signals is divided by 2 in the frequency bisecting circuits 542 and 543, respectively to produce signals of weighted addition at ratios of 0.25/0.75 and 0.75/0.25, respectively. The line interpolated chrominance signals thus produced are supplied to a switcher 537 and may be derived successively therefrom in the same manner as which has been explained with respect to the luminance signal line interpolator 52.

Usually the switchers 536 and 537 may comprise gate circuits and a driving pulse for the gate circuits may be produced in relation to the horizontal scanning period H' of the first color television signal.

Now the switching rate of the switcher 536 will be explained with reference to a Table 1. In the first and second fields of the FM color difference signals supplied from the luminance-chrominance separator 51, the blue color difference signal B-Y is transmitted on an odd numbered line and the red color difference signal R-Y is transmitted on an even numbered line, while in the third and fourth fields, the R-Y signal is on an odd numbered line and the B-Y signal is on an even numbered line. In the actual SECAM signal, on nine lines in the vertical flyback period, there are transmitted color identification signals for indicating the parity of the color difference signals B-Y and R-Y. The table 1 shows the color sequence of the SECAM signal and the chrominance signal sequence after a line conversion which will be described hereinlater. For the sake of simplicity, the blue color difference signal is denoted by B and the red color difference signal by R.

TABLE 1

| Generalized line number | First field | | | | Second field | | | | Third field | | | | Fourth field | | | |
|---|---|---|---|---|---|---|---|---|---|---|---|---|---|---|---|---|
| | Input line number | Input line chrominance signal | Line number after line conversion | Converted line chrominance signal | Input line number | Input line chrominance signal | Line number after line conversion | Converted line chrominance signal | Input line number | Input line chrominance signal | Line number after line conversion | Converted line chrominance signal | Input line number | Input line chrominance signal | Line number after line conversion | Converted line chrominance signal |
| | 1 | B | 1 | B | 314 | R | 264 | R | 1 | R | 1 | R | 314 | B | 264 | B |
| | 2 | R | 2 | R | 315 | B | 265 | B | 2 | B | 2 | B | 315 | R | 265 | R |
| | . . . | . . . | . . . | . . . | . . . | . . . | . . . | . . . | . . . | . . . | . . . | . . . | . . . | . . . | . . . | . . . |
| | 17 | B | 17 | B | | | | | 17 | R | 17 | R | | | | |
| 12n−6 | [1] 18 | R | | | [1] 330 | R | | | [1] 18 | B | | | [1] 330 | B | | |
| 12n−5 | 19 | B | 18 | R | 331 | B | 280 | R | 19 | R | 18 | B | 331 | R | 280 | B |
| 12n−4 | 20 | R | 19 | B | 332 | R | 281 | B | 20 | B | 19 | R | 332 | B | 281 | R |
| 12n−3 | 21 | B | 20 | R | 333 | B | 282 | R | 21 | R | 20 | B | 333 | R | 282 | B |
| 12n−2 | 22 | R | 21 | B | 334 | R | 283 | B | 22 | B | 21 | R | 334 | B | 283 | R |
| 12n−1 | 23 | B | 22 | R | 335 | B | 284 | R | 23 | R | 22 | B | 335 | R | 284 | B |
| 12n | [2] 24 | R | | | [2] 336 | R | | | [2] 24 | B | | | [2] 336 | B | | |
| 12n+1 | 25 | B | 23 | B | 337 | B | 285 | B | 25 | R | 23 | R | 337 | R | 285 | R |
| 12n+2 | 26 | R | 24 | R | 338 | R | 286 | R | 26 | B | 24 | B | 338 | B | 286 | B |
| 12n+3 | 27 | B | 25 | B | 339 | B | 287 | B | 27 | R | 25 | R | 339 | R | 287 | R |
| 12n+4 | 28 | R | 26 | R | 340 | R | 288 | R | 28 | B | 26 | B | 340 | B | 288 | B |
| 12n+5 | 29 | B | 27 | B | 341 | B | 289 | B | 29 | R | 27 | R | 341 | R | 289 | R |
| 12n+6 | [1] 30 | R | | | [1] 342 | R | | | [1] 30 | B | | | [1] 342 | B | | |
| | 31 | B | 28 | R | 343 | B | 290 | R | 31 | R | 28 | B | 343 | R | 290 | B |
| | . . . | . . . | . . . | . . . | . . . | . . . | . . . | . . . | . . . | . . . | . . . | . . . | . . . | . . . | . . . | . . . |
| | 311 | B | 262 | R | 623 | B | 524 | R | 311 | R | 262 | R | 623 | R | 524 | B |
| | [2] 312 | R | | | [2] 624 | R | | | [2] 312 | B | | | [2] 624 | B | | |
| | 313 (½) | B | 263 (½) | B | 625 | B | 525 | B | 313 (½) | R | 263 (½) | R | 625 | R | 525 | R |

[1] Succeeding five lines change the sequence of chrominance signal in chrominance signal line interpolation.
[2] Succeeding five lines retain the sequence of chrominance signal in chrominance signal line interpolation.

Note.—½ represents the last scanning line of a field, whose duration is one half of other scanning lines of the field.

As shown in Table 1, for example, on the 23rd line of the first field, the blue color difference signal B-Y is transmitted and on the 340th line of the second field, the red color difference signal R-Y is transmitted. After the 625th line of the fourth field, the color sequence starts again from the 1st line of the first field. Lines from 1st to 22nd of the first and third fields and lines from 314th to 335th of the second and fourth fields correspond to the vertical flyback periods, so that they do not appear on the picture.

In order to retain the correct line sequence of the chrominance signal after the line conversion, at an input of the line conversion, i.e. at an output of the chrominance signal line interpolator 53, it is necessary to reverse the color sequence at a repetition rate of six lines. That is to say, the output from the chrominance signal line interpolator 53 should be so switched that the sequence of the chrominance signal on the even and odd lines is retained in successive six lines, but is reversed in the next successive six lines. In the Table 1, the line numbers and the color difference signals transmitted thereon after the line conversion are also shown. As shown in the Table 1, the line sequence of the chrominance signal is retained as it is for successive six lines $12n$, $12n\pm1$, $12n+2$, . . . , $12n+5$ starting from the line of multiple of 12 (this line is indicated with a mark * in the Table 1), but the line sequence of the chrominance signal is reversed for successive six lines $12n-6$, $12n-5$, . . . , $12n-1$ starting from the line of multiple of six, but not multiple of 12 (this line is indicated with a mark ° in the Table 1).

In order to obtain such a line sequence of the chrominance signal, the switcher 536 is driven by driving pulses having a six line period so that the pair-wised signals of non-delayed and 2H'-delayed signals and of 1H'-delayed and 3H'-delayed signals are derived alternatively at a rate of six lines.

The switcher 537 is so operated that the line interpolated chrominance signal can be obtained in the desired line sequence. That is to say, two adjacent color difference signals of the same kind are combined with weighted addition at ratios of 0, 0.25, 0.5, 0.75 and 1, these ratios being identical with those used in the beforementioned luminance signal line interpolation (in the luminance signal line interpolation, these ratios are indicated by A, ¼(3A+B), ½(A+B), ¼(A+3B) and B, respectively).

Figure 3:
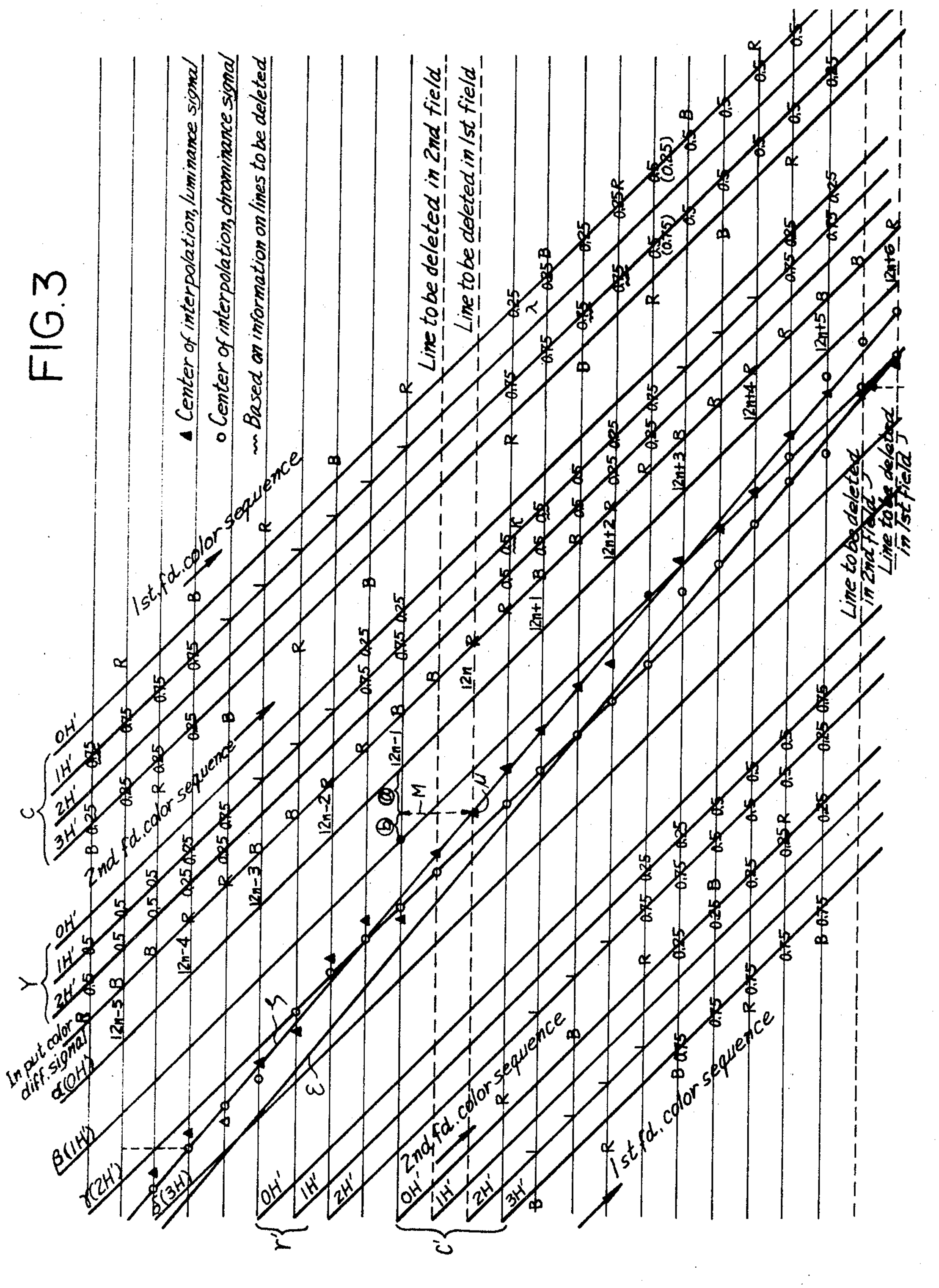
FIG. 3 is an explanatory diagram of the line interpolation.

Now the operation of the switchers 536 and 537 in the chrominance signal line interpolator 53 and the switcher 532 in the luminance signal line interpolator 52 will be explained in detail with reference to FIG. 3 showing the conversion from the first color television signal of 625/50 into the second color television signal of 525/60.

In FIG. 3, lateral lines correspond to 625 horizontal scanning lines of the first and second fields of the first color television signal. An oblique line $\alpha$ represents a straight line in the picture comprising the input signal applied to the line interpolator 5 and corresponds to the non-delayed signal. Oblique lines $\beta$, $\gamma$ and $\delta$ represent corresponding positions in the picture of the 1H'-delayed, 2H'-delayed and 3H'-delayed signals, respectively.

According to the invention, in the line converter 7 (see FIG. 1), 312.5 lines of each field of the input first color television signal are reduced by 50 lines by deleting one scanning line from each successive six lines and then each field having 50 signal-free periods, i.e. blank periods produced by said line deletion is converted to a new field without the blank periods by successively shifting the remaining lines. Therefore, the straight line $\alpha$ in the input picture will be discontinued at the deleted line positions. Moreover, in a succeeding field setter 8 (see FIG. 1) for setting the parity of the field, a weight position of the picture flactuates up and down to an extent corresponding to H'/2 period. In the line interpolator 5, the line interpolated signal is obtained by weighted addition at suitable ratios so as to precompensate both of the above-mentioned discontinuity of the straight line $\alpha$ in the picture and the flactuation in the weight position.

In FIG. 3, a straight line $\zeta$ corresponds to the weight position of the aforementioned discontinuous line picture. When two adjacent lines are combined with weighted addition at ratios corresponding to the weight position indicated by said line $\zeta$, there can be obtained the line interpolated signal which can compensate for the above discontinuity of the straight line. The aforementioned switchers are so driven as to derive such line interpolated signal. It should be noted that the line $\zeta$ shows the preferred weight position according to which the above line interpolated signal can be obtained by means of minimum number of delay lines and that there exist an infinite number of lines parallel to said line $\zeta$.

A straight line $\epsilon$ is one of such parallel lines and indicates weight positions at positions replaced by a distance corresponding to H'/2 from said line $\zeta$. In order to precompensate said fluctuation in weight position caused by setting the parity of the field in the succeeding field setter 8, it is necessary to produce the line interpolated signal corresponding to said weight position indicating line $\epsilon$.

On the straight line $\alpha$, the signals at positions denoted by $12n+i$ ($n$: integer, $i$=0, ±1, ±2, . . . ±11) correspond to the line signals of the first field and those at the intermediate positions correspond to the line signals of the second field. The color difference signals transmitted on these lines are denoted by B and R, respectively on a line shown at the right hand side of the line $\alpha$. In other words, the marks B and R on said line indicate the blue and red color difference signals, respectively on each line of the first and second fields.

In the present embodiment shown in FIG. 3, for example, the line interpolated luminance signal for non-delayed ($12n+1$) line can be obtained by adding with weighting at a ratio of 0.5/0.5 the 1H'-delayed signal represented by the line $\beta$ and the 2H'-delayed signal represented by the line $\gamma$ and the line interpolated luminance signal for the non-delayed ($12n+2$) line can be produced by weighted addition at a ratio of 0.75/0.25 the 1H'-delayed signal denoted by the line $\beta$ and the 2H'-delayed signal denoted by the line $\gamma$. Ratios for effecting the weighted addition with respect to the luminance line signal should be determined by considering the operation of the succeeding field setter 8. In FIG. 3, the luminance signal passing through a H/2-delayed line in the field setter 8 is represented by three lines Y' and the luminance signal which does not pass through H/2-delay line in the field setter 8 is represented by three lines Y. For example, since an image of an intersection of a dotted line M and the ($12n-1$) line occurs at a position $\mu$ on a 12nth line which line is deleted during the conversion, a line interpolated signal must be produced prior to the line conversion by adding with weighting at a ratio inversely proportional to a ratio of time periods ⓐ and ⓑ the non-delayed (OH') signal and the 1H'-delayed signal.

In FIG. 3, there are also shown ratios of the addition with weighting for the pair-wised non-delayed and 2H'-delayed signals and 1H'-delayed and 3H'-delayed signals in the chrominance signal line interpolator 53. In FIG. 3, the lines C' denote the ratios and the color sequence for the signal passing through the H/2-delay line of the succeeding field setter 8 and the lines C denote the ratios and the color sequence for the chrominance signal which does not pass through the H/2-delay line of the field setter 8.

In Table 2, the ratios of weighted addition for each line signal of the odd and even fields are indicated with the understanding that successive five fields are passed through the H/2-delay line and the next successive five fields are not passed through the H/2-delay line in the field setter 8. The switchers 525, 532, 536 and 537 in the luminance signal line interpolator 52 and the chrominance signal line interpolator 53 are so operated that the line interpolated signals having the desired color sequence and ratios of the weighted addition shown in the Table 2 can be derived.

the FM luminance line interpolated signal of 30 MHz is applied and is added with the FM-FM signal of 130 MHz so as to obtain an FM signal having a frequency band of 100 MHz corresponding to the difference frequency therebetween. This FM signal is applied to a frequency converter 546 to which a 130 MHz signal is also applied from a local oscillator 547 and is converted into an FM signal of 30 MHz.

The line interpolated FM signal thus derived from the line interpolator 5 is fed to a line difference compensator 6 as shown in FIG. 1.

Figure 4:
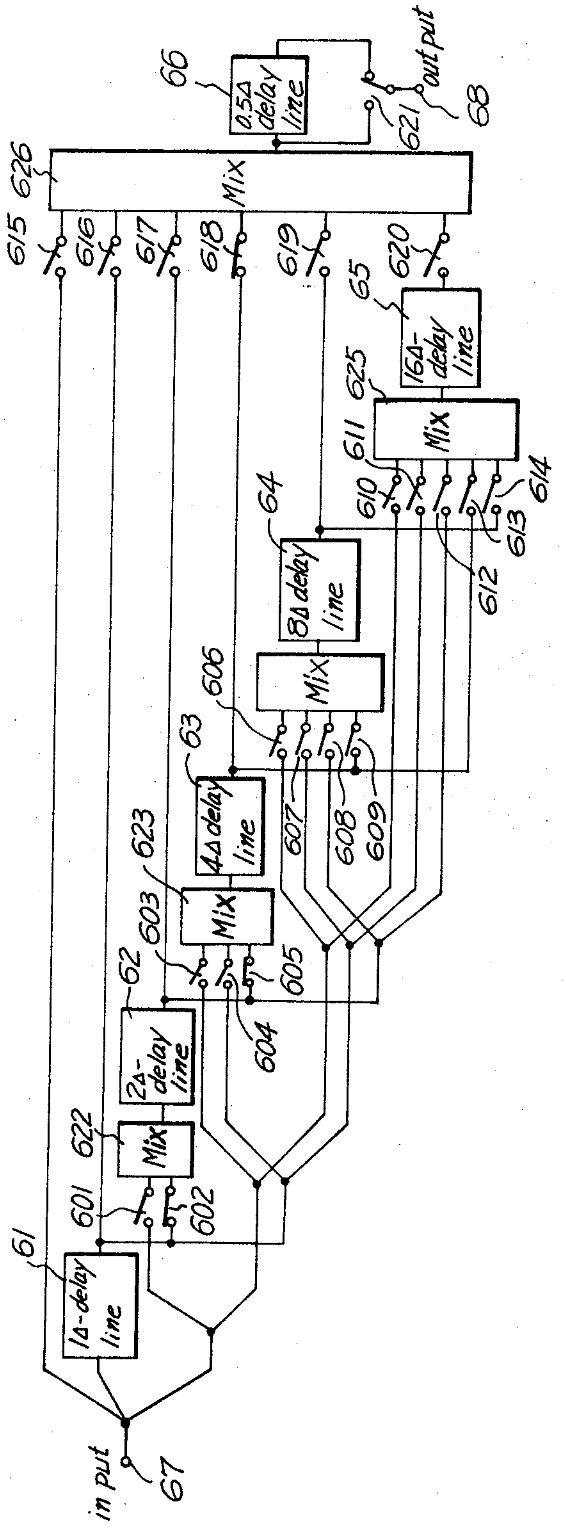
FIG. 4 is a simplified block diagram showing one embodiment of the line length difference compensator.

FIG. 4 shows a basic construction of the line difference compensator 6. As is well-known, a length of a line of 625/50 standards is 64 μs and that of 525/60 standards is 63.492 μs. Thus, the difference Δ in the line length between 625/50 and 525/60 standards is equal to 0.508 μs. In FIG. 4, the reference numerals 61, 62, 63, 64, 65 and 66 denote delay lines having fixed delay times of 1Δ, 2Δ, 4Δ, 8Δ, 16Δ and 0.5Δ, respectively. These delay lines may be selectively connected into circuit by means of a group of switching elements 601, 602, 603, . . . , 621 consisting of, for example, gate circuits which are driven by control signals having phases on the basis of the synchronizing signals of the input first color television signal. By means of

TABLE 2

| | | First field | | | | | | | | Second field | | | | | | | |
|---|---|---|---|---|---|---|---|---|---|---|---|---|---|---|---|---|---|
| | | Weighted ratio for luminance signal interpolation | | | Weighted ratio for chrominance signal interpolation | | | | | Weighted ratio for luminance signal interpolation | | | Weighted ratio for chrominance signal interpolation | | | | |
| Group | Input line number | 2H | 1H | 0H | 3H | 2H | 1H | 0H | C | 2H | 1H | 0H | 3H | 2H | 1H | 0H | C |
| To be ½ H-delayed at field setter. | 12n−5 | 0.5 | 0.5 | | 0.25 | | 0.75 | | R | 0.5 | 0.5 | | 0.25 | | 0.75 | | B |
| | 12n−4 | 0.25 | 0.75 | | 0.25 | | 0.75 | | B | 0.5 | 0.5 | | 0.25 | | 0.75 | | R |
| | 12n−3 | | 1 | | | | 1 | | R | 0.25 | 0.75 | | | | 1 | | B |
| | 12n−2 | | 1 | | | | 1 | | B | | 1 | | | | 1 | | R |
| | 12n−1 | | 0.75 | 0.25 | | | 1 | | R | | 0.75 | 0.25 | | | 1 | | B |
| | 12n | | | | To be deleted | | | | | | | | To be deleted | | | | |
| | 12n+1 | 0.5 | 0.5 | | | 0.75 | | 0.25 | B | 0.5 | 0.5 | | | 0.75 | | 0.25 | R |
| | 12n+2 | 0.25 | 0.75 | | | 0.75 | | 0.25 | R | 0.5 | 0.5 | | | 0.75 | | 0.25 | B |
| | 12n+3 | | 1 | | | 0.5 | | 0.5 | B | 0.25 | 0.75 | | | 0.5 | | 0.5 | R |
| | 12n+4 | | 1 | | | 0.5 | | 0.5 | R | | 1 | | | 0.5 | | 0.5 | B |
| | 12n+5 | | 0.75 | 0.25 | | 0.25 | | 0.75 | B | | 0.75 | 0.25 | | 0.5 | | 0.5 | R |
| | 12n+6 | | | | To be deleted | | | | | | | | To be deleted | | | | |
| Not to be delayed at field setter. | 12n−5 | 1 | | | 0.5 | | 0.5 | | R | 1 | | | 0.5 | | 0.5 | | B |
| | 12n−4 | 1 | | | 0.5 | | 0.5 | | B | 1 | | | 0.5 | | 0.5 | | R |
| | 12n−3 | 0.75 | 0.25 | | 0.25 | | 0.75 | | R | 0.75 | 0.25 | | 0.5 | | 0.5 | | B |
| | 12n−2 | 0.5 | 0.5 | | 0.25 | | 0.75 | | R | 0.5 | 0.5 | | 0.25 | | 0.75 | | R |
| | 12n−1 | 0.25 | 0.75 | | 0.25 | | 0.75 | | R | 0.5 | 0.5 | | 0.25 | | 0.75 | | B |
| | 12n | | | | To be deleted | | | | | | | | To be deleted | | | | |
| | 12n+1 | 1 | | | | 1 | | | B | 1 | | | | 1 | | | R |
| | 12n+2 | 1 | | | | 1 | | | R | 1 | | | | 1 | | | B |
| | 12n+3 | C.15 | 0.25 | | | 0.75 | | 0.25 | B | 0.75 | 0.25 | | | 1 | | | R |
| | 12n+4 | 0.5 | 0.5 | | | 0.75 | | 0.25 | R | 0.5 | 0.5 | | | 0.75 | | 0.25 | B |
| | 12n+5 | 0.25 | 0.75 | | | 0.75 | | 0.25 | B | 0.5 | 0.5 | | | 0.75 | | 0.25 | R |
| | 12n+6 | | | | To be deleted | | | | | | | | To be deleted | | | | |

NOTE.—Underlined information is carried by scanning lines to be deleted.

As is apparent from the Table 2, since the line interpolated signal is produced prior to the line conversion, so that the line interpolated signal, for example, for $(12n+1)$st line, the $12n$th line which will be deleted in the succeeding line converter is used, the information in the lines which will be lost in the line conversion can be included in the line interpolated signal, so that the information can be utilized more effectively.

The line interpolated signals derived from the luminance signal interpolator 52 and the chrominance signal line interpolator 53 are supplied to a frequrncy adder 54. The FM color difference signal having the desired ratio of weighted addition is fed to a frequency modulator 544 which frequency-modulates a carrier having a frequency of 130 MHz therein so as to produce the FM-FM signal having a frequency band of 130 MHz. This FM-FM signal is applied to a frequency adding circuit 545. To this frequency adding circuit 545, such arrangement various delay times may be obtained at a step of Δ. In the position shown in the drawing, the switching elements 602, 605 and 618 are closed and the switching element 621 is connected to an output terminal of the 0.5Δ-delay line 66, so that the input signal applied to an input terminal 67 is delayed by 6.5Δ at an output terminal 68. The reference numerals 622, 623, . . . , 626 indicate mixing circuits consisted of resistance networks.

Figure 5A:
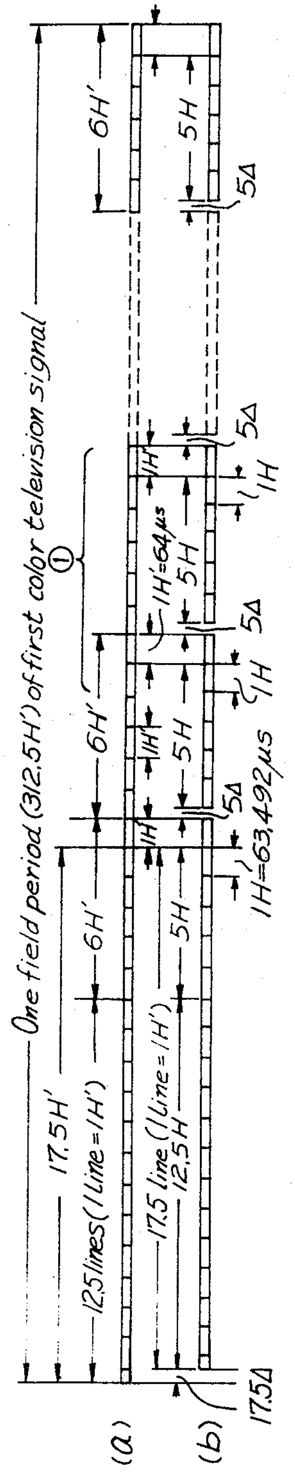
FIG. 5A is a time chart showing the operation of the line difference compensator.
Figure 5B:
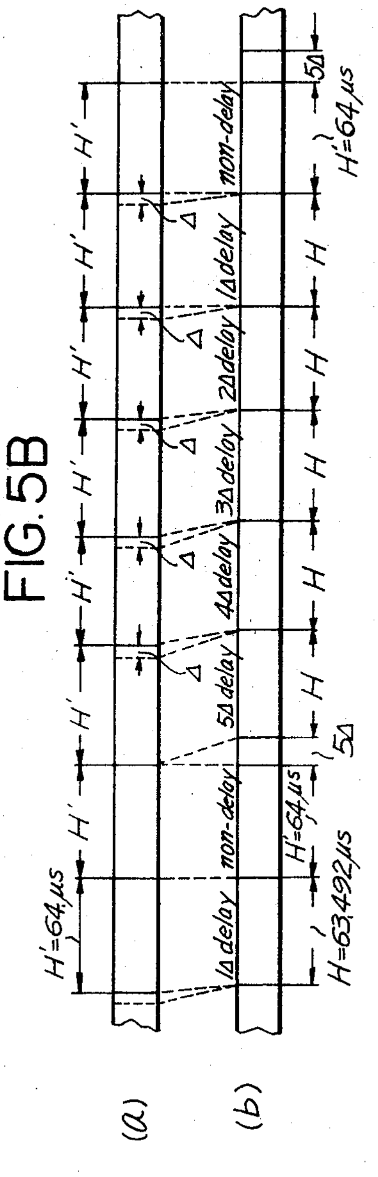
FIG. 5B is an enlarged chart of one portion of the time chart shown in FIG. 5A.

To the input terminal 67, the first color television signal as shown in FIG. 5A(a) is applied. During 17.5 lines succeeding from a starting point of the vertical synchronizing period of each field of the input color television signal, each switching element is selectively operated so that the magnitude of delay time is successively reduced to 17.5Δ, 17Δ, 16Δ, 15Δ, . . . 0Δ at a rate of the horizontal scanning period H or a half the horizontal period H of the second color television signal and for the remaining lines succeeding to said 17.5 lines, the switching elements are selectively operated so that the magnitude of delay time is successively reduced by 1Δ in the sequence of 5Δ, 4Δ, 3Δ, 2Δ, 1Δ and 0Δ at a repetion rate corresponding to six line period 6H′ of the input first color television signal. In this case the switching rate from 5Δ to 1Δ must correspond to the horizontal scanning period H of the second color television signal. The signal thus obtained from the output terminal 72 is shown in FIG. 5A(b). As shown in FIG. 5A(b), immediately after the vertical synchronizing signal of the first color television signal, there is formed a blank period of 17.5Δ and then 17.5 lines each having the line length of H(63.492 μs) and one line having the length of H′ are succeeded and in each 6H′ period of the remaining period, the successive six lines of the input first color television signal are converted into a blank period of 5Δ, five lines each having the length of H and one line having the length of H′. FIG. 5B shows a portion ① of the input and output signals shown in FIG. 5A on an enlarged scale. The time sequence signals in FIG. 5B(a) and (b) correspond to those in FIG. 5A(a) and (b). As seen from FIG. 5B(b), there are fifty groups of lines each consisting of five lines of the length H and one line of the length H′ for each field. When the last one line of H′ in each group is deleted in the succeeding line converter 7 (see FIG. 1), 50 lines of H′ are totally lost and 312.5 lines in a field of the first color television signal are converted into 262.5 lines.

Figures 6, 7:
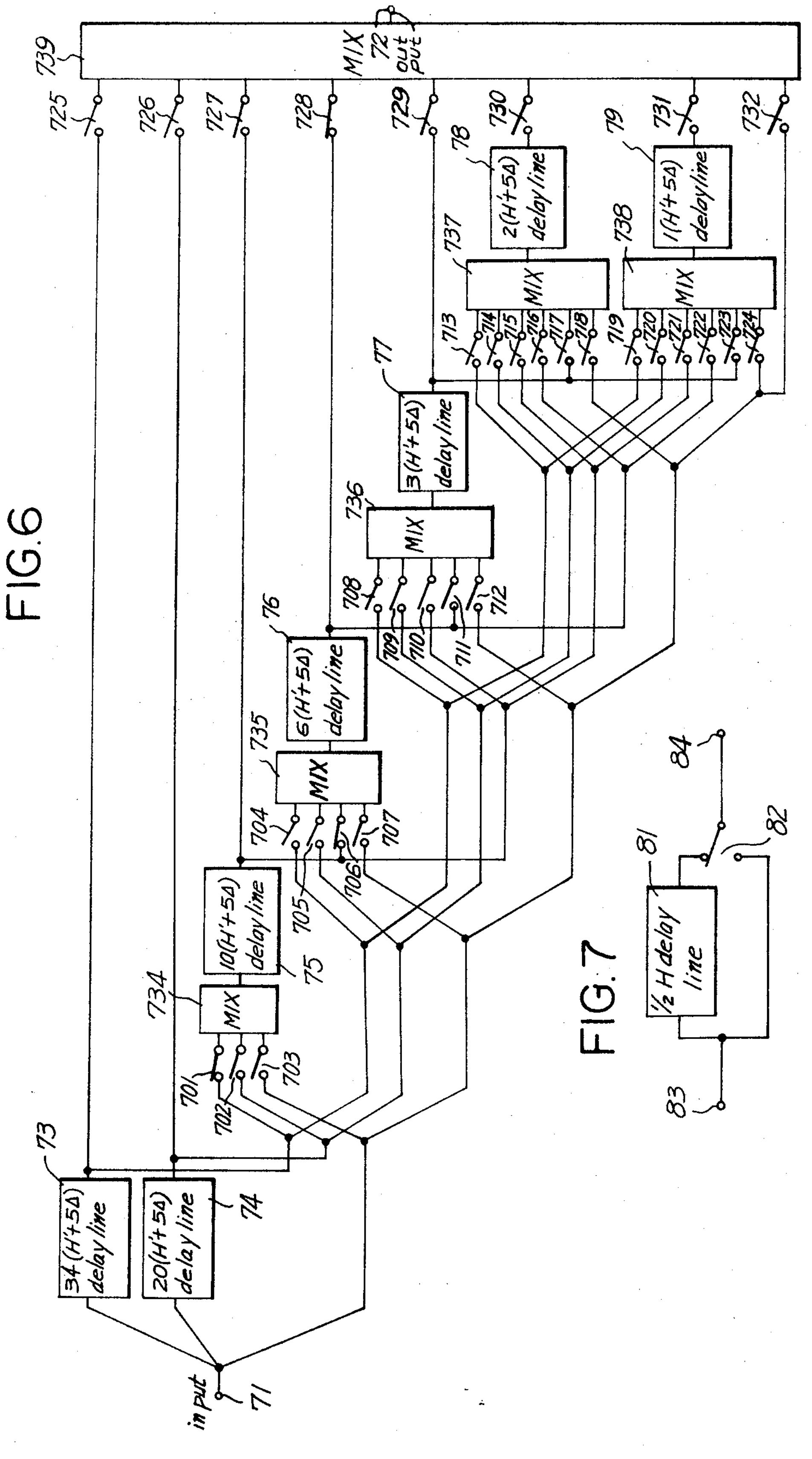
FIG. 6 is a simplified block diagram showing one embodiment of the line compensator.
FIG. 7 is a block diagram of one embodiment of the field setter.

The output signal thus derived from the line difference compensator 6 is supplied to a next line converter 7 shown in FIG. 1. FIG. 6 shows an embodiment of the line converter 7.

In FIG. 6, the reference numerals 71 and 72 denote input and output terminals, respectively and the reference numerals 73, 74, 75, 76, 77, 78 and 79 denote delay lines having delay times of 34(H′+5Δ), 20(H′+5Δ), 10(H′+5Δ), 6(H′+5Δ), 3(H′+5Δ), 2(H′+5Δ) and (H′+5Δ), respectively. Also in the line converter 7, a number of switching elements 701, 702, . . . , 732 may consist of gate circuits and a number of mixing circuits 734, 735, . . . , 739 may consist of resistance networks. As mentioned above, the time sequence signal as shown in FIG. 5A(b) is applied to the input terminal 71. The switching elements are selectively operated so that the signal portion of the input first color television signal during the 17.5H′ period is delayed by a delay time equal to 50H′+250Δ. That is, by closing the switching elements 701, 706 and 729 as shown in FIG. 6 to connect the delay lines 73, 75 and 76 into circuit, the delay time of 50H′+250Δ can be obtained.

In a similar manner with respect to each six line period 6H′ of the remaining line signal, the switching elements are selectively operated at a rate of 5H period so that the delay time is successively reduced from the maximum delay time of 50H′+250Δ to zero at a step of H′+5Δ.

A Table 3 represents the combination of delay lines which are connected into circuit by selectively switching the switching elements. In this Table 3, delay lines which are connected between the input terminal 71 and the output terminal 72 are indicated by hatching.

TABLE 3

| The number of 50 groups each consisted of 6 lines | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1 (H′+5Δ) delay line | // | | | // | | | // | | | | // | | | // | | | // | | | | // | | | // | |
| 2 (H′+5Δ) delay line | | // | | | // | | | // | | | | // | | | // | | | // | | | | // | | | /// |
| 3 (H′+5Δ) delay line | | | /// | /// | // | | | | // | | | | /// | /// | // | | | | // | | | | /// | /// | /// |
| 6 (H′+5Δ) delay line | | | | | | /// | /// | /// | // | | | | | | | /// | /// | /// | // | | | | | | |
| 10 (H′+5Δ) delay line | | | | | | | | | | /// | /// | /// | /// | /// | /// | /// | /// | /// | /// | | | | | | |
| 20 (H′+5Δ) delay line | | | | | | | | | | | | | | | | | | | | /// | /// | /// | /// | /// | /// |
| 34 (H′+5Δ) delay line | | | | | | | | | | | | | | | | | | | | | | | | | |

| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 |
|---|---|---|---|---|---|---|---|---|---|---|---|---|---|---|---|---|---|---|---|---|---|---|---|---|---|
| 1 (H′+5Δ) delay line | | // | | | | // | | | | // | | | // | | | // | | | | // | | | // | | |
| 2 (H′+5Δ) delay line | | | // | | | | // | | | | // | | | // | | | // | | | | // | | | // | |
| 3 (H′+5Δ) delay line | | | | // | | | | // | | | | /// | /// | // | | | | // | | | | /// | /// | // | |
| 6 (H′+5Δ) delay line | /// | /// | /// | // | | | | | | | | | | | /// | /// | /// | // | | | | | | | /// |
| 10 (H′+5Δ) delay line | | | | | /// | /// | /// | // | | | | | | | | | | | /// | /// | /// | /// | /// | /// | /// |
| 20 (H′+5Δ) delay line | /// | /// | /// | /// | /// | /// | /// | // | | | | | | | | | | | | | | | | | |
| 34 (H′+5Δ) delay line | | | | | | | | | /// | /// | /// | /// | /// | /// | /// | /// | /// | /// | /// | /// | /// | /// | /// | /// | /// |

NOTE.—Hatching indicates delay line connected into circuit.

In the manner described above, the last one line of 1H′ and the blank period of 5Δ in each group of the input signal shown in FIG. 5A(b) are simultaneously deleted and the line converted signal is derived from the output terminal 72. In this output signal as shown in FIG. 9(a), after each vertical synchronizing signal a blank period of 50H′+262.5Δ is followed by the continuous signal of 262.5 lines, each line having the period of 1H (H=63.492 μs). In this manner, the number of lines is converted. The period during which 262.5 lines appear corresponds to 1/60 second and the blank period of 50H′+262.5Δ corresponds to a fifth of a field period of 525/60 system. The line converted signal is fed to a next field setter 8 (see FIG. 1).

FIG. 7 shows an embodiment of the field setter. The present field setter is composed of a H/2-delay line 81 and a switching element 83. The switching element 82 is so controlled that, its switching arm is switched at a rate of five field periods related to the vertical synchronizing period of the first color television signal. Thus, the successive five field signal of the input signal applied to an input terminal 83 is passed through the H/2-delay line 81 to an output terminal 84, but the next successive five field signal does not pass through the H/2-delay line 81 is directly applied to the output terminal

84.

Figure 8:
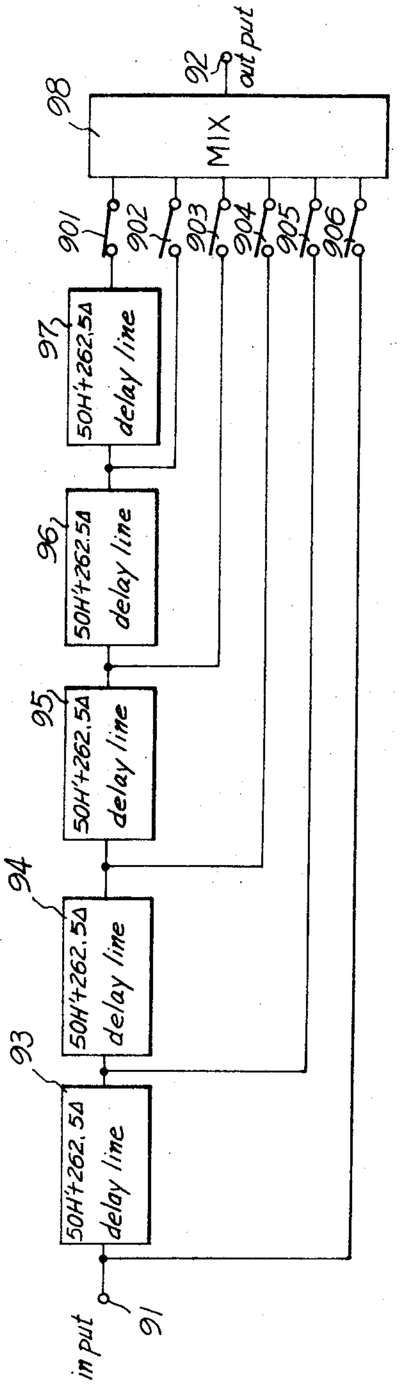
FIG. 8 is a block diagram showing one embodiment of the field converter.

The output signal from the field setter 8 is applied to a next field converter 9 (see FIG. 1). In the field converter 9, one of each five successive fields is used twice so that input 50 fields are converted into 60 fields. FIG. 8 shows an embodiment of the field converter 9.

In FIG. 8, the reference numerals 91 and 92 indicate input and output terminals, respectively, the reference numerals 93, 94, 95, 96 and 97 denote delay lines each having a delay time of (50H'+262.5Δ), and the reference numerals 901, 902, 903, 904, 905 and 906 indicate switching elements. These switching elements 901, 902, . . . , 906 are successively operated so that the magnitude of delay time can be changed in a range of ~ 5(50H'+262.5Δ) at a step of (50H'+262.5Δ). In the condition shown in FIG. 8, since the switching element 901 is selectively closed, all of the delay lines 93, 94, . . . , 97 are connected in series between the input and output terminals 91 and 92.

Figure 9:
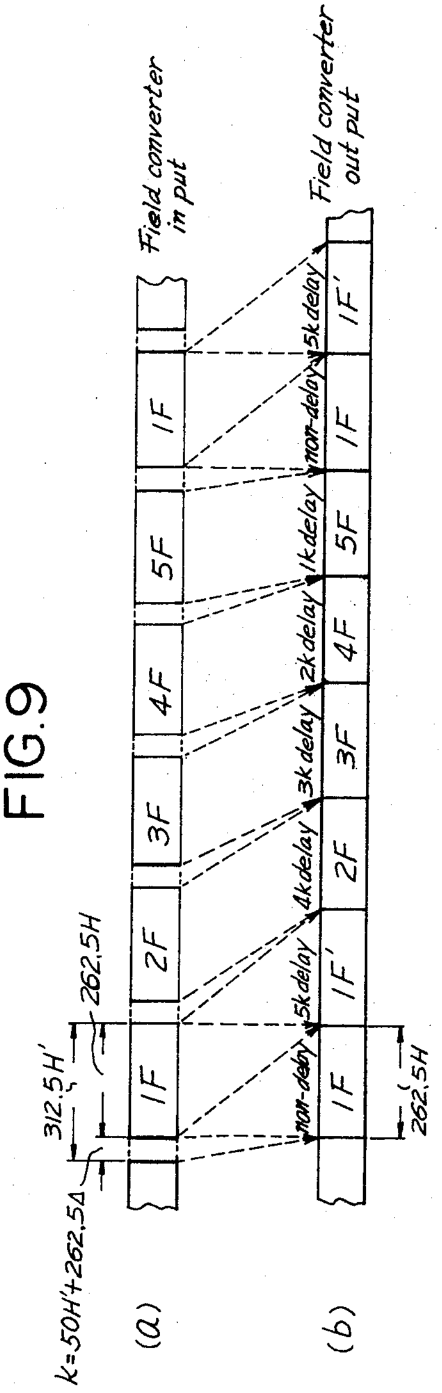
FIG. 9 is a time chart explaining the operation of the field converter.

The input signal applied to the input terminal 91 is the time sequence signal as shown in FIG. 9(a). In this input signal, during each field period (312.5H') of the first color television signal, there are the blank portion of 50H'+262.5Δ and the continuous signal portion (in FIG. 9 denoted by F) of 262.5 lines, each line having the length equal to H'−Δ=H. In the field converter, to such an input signal is given successively delay times of zero, 5(50H'+262.5Δ), 4(50H'+262.5Δ), 3(50H'+262.5Δ), 2(50H'+262.5Δ), (50H'+262.5Δ), zero and so on at a rate of 262.5H period, so that each successive five fields of the input signal are converted into successive six fields at the output terminal 92. It should be noted that the blank period of (50H'+262.5Δ) in each field is removed and that when the delay time is switched from zero to 5(50H'+262.5Δ), the same continuous signal as that obtained with the zero delay is repeatedly derived. In FIG. 9(b) there is shown the field converted output signal thus derived. The continuous signal 1F in the input signal shown in FIG. 9(a) is derived twice with the zero delay and 5(50H'+262.5Δ) delay. In FIG. 9, the delay time of (50H'+262.5Δ) is indicated by *k* for the sake of simplicity. In this manner each successive five fields of the input signal is converted into each successive six fields of the output signal.

Figure 10:
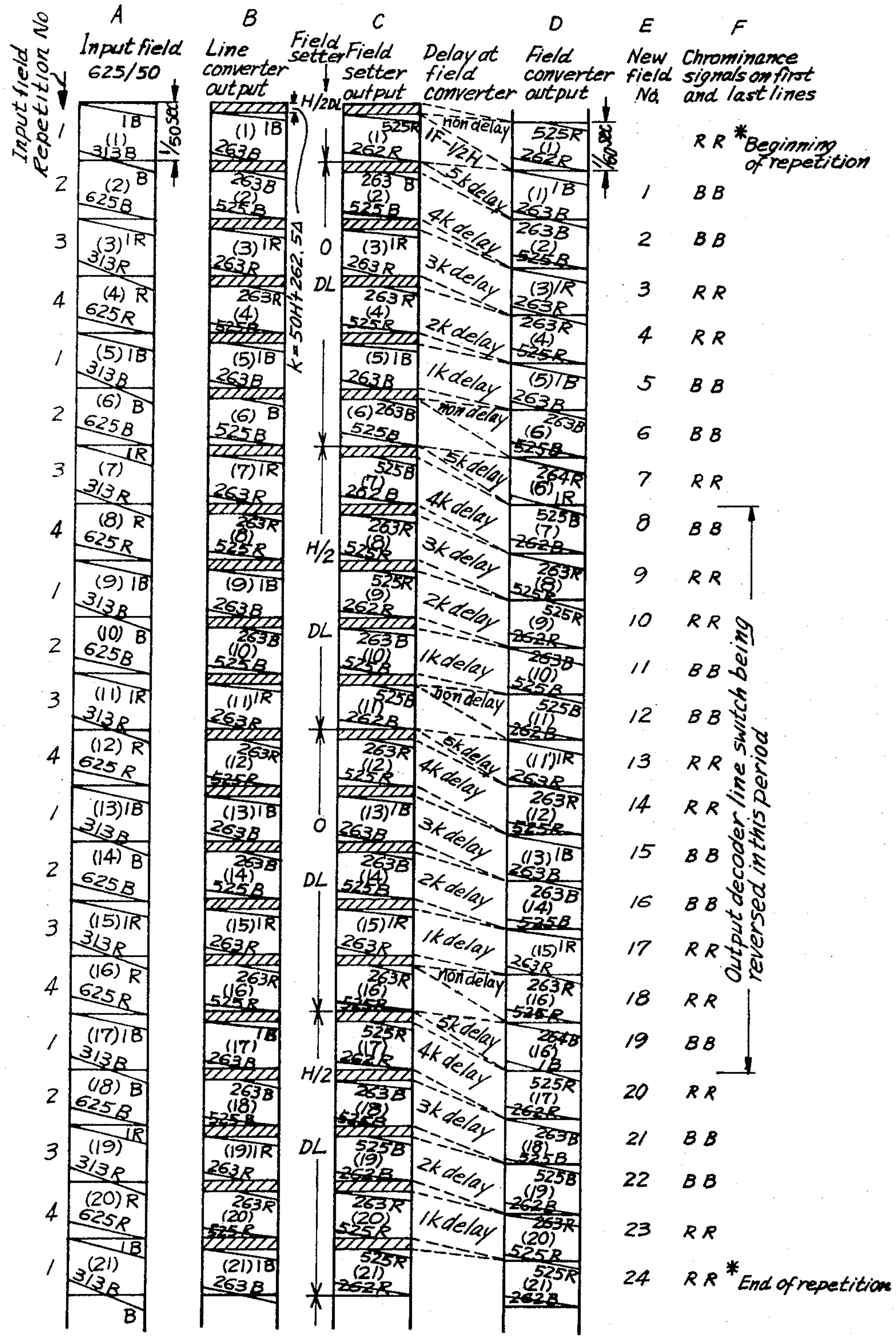
FIG. 10 is a diagram showing the processing of the signal by the constructive equipment of the system of the present invention.

FIG. 10 is a chart for illustrating the situation of the signal processes in the line converter, the field setter and the field converter. In the columns A, B, C and D, the first and last lines in each field are denoted by oblique lines with the line number and the blue and red color difference signals transmitted on said first and last lines are also indicated by B and R, respectively. A numerical figure shown in a bracket at the center of each field indicates the field number.

As shown in the column D, the color sequence of the output signal from the field converter 9 is reversed for the time period from seventh field to sixteenth field at a period equal to twice the switching period of the field setter 8.

The output signal from the field converter 9 thus converted from 625/50 standards into 525/60 standards is supplied to a next time error compensator 10 (see FIG. 1) for compensating fluctuation of the television signal on a time axis.

Figure 11:
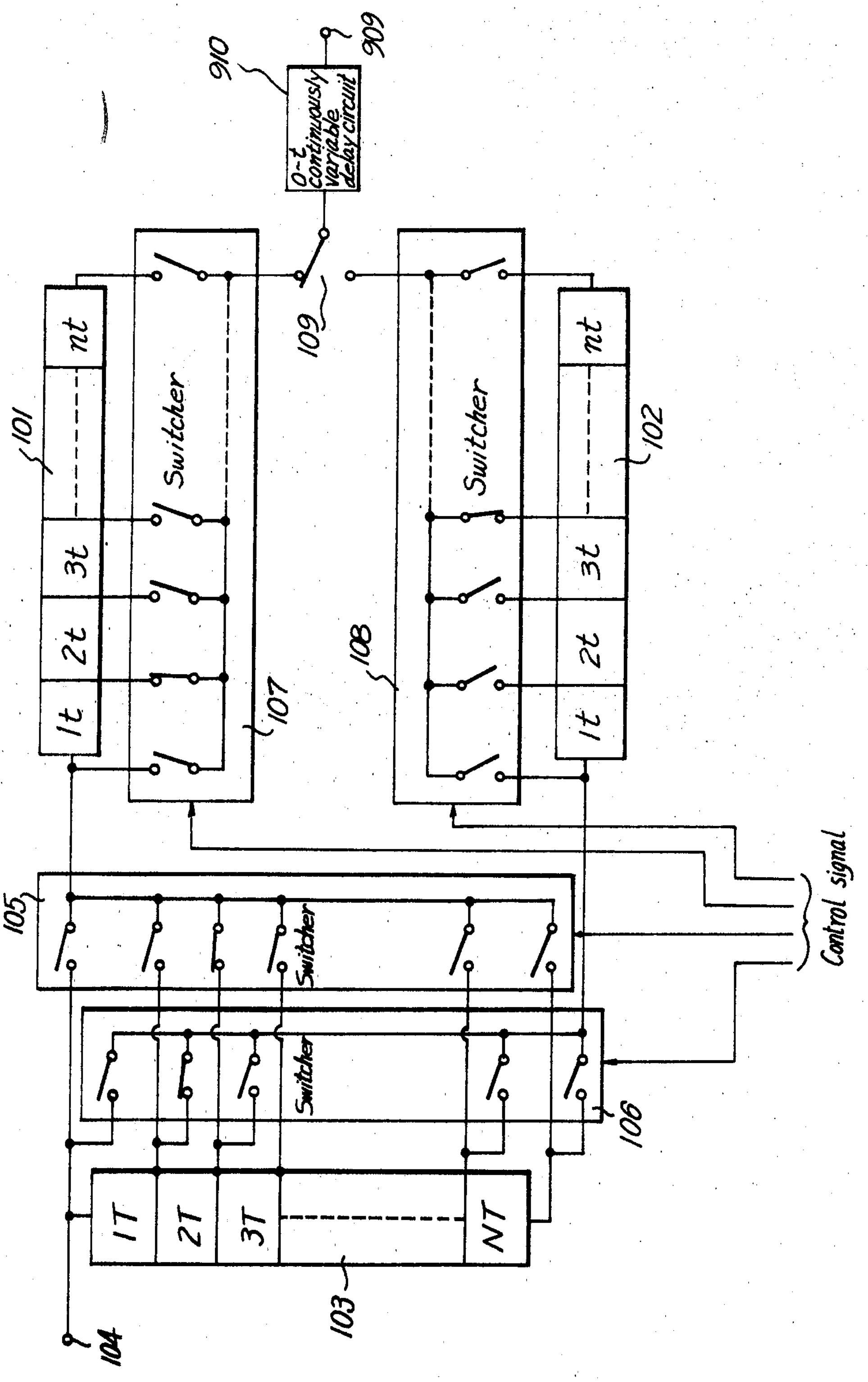
FIG. 11 is a circuit diagram of one embodiment of the time error compensator.

FIG. 11 shows an embodiment of the time error compensator 10. The present time error compensator 10 comprises two sets of tapped variable delay circuits 101 and 102, each consisting of a series connection of *n* delay circuits having delay times equal to a fine delay time *t* and equal to integer multiples of t and a tapped variable delay circuit 103 consisting of a series connection of N delay circuits having long delay times equal to $T=(n+1)t$ and equal to integer multiples of *T*. The time error compensator further comprises switches 107 and 108 having switching elements connected to the taps of the tapped variable delay circuits 101 and 102, respectively and switchers 105 and 106 each having switching elements connected to the taps of the tapped variable delay circuit 103. These tapped variable delay circuits 101, 102 and 103 and switchers 105, 106, 107 and 108 constitute a digital delay device giving to the input signal applied to an input terminal 104 $(N+1)(n+1)$ different delay times from zero to $(N+1)T-t$ with a step of *t*. The time error compensator further comprises a fine delay circuit 910 a delay time of which can be changed continuously from 0 to t.

Now the operation of the present time error compensator will be described. For example, it is assumed that a portion 2T of the tapped variable delay circuit 103 selected by the switcher 105 is connected in series with a portion 1t of the tapped variable delay circuit 101 selected by the switcher 107 and a portion 1T of the tapped variable delay circuit 103 selected by the switcher 106 is connected in series with a portion 3t of the tapped variable delay circuit 102 selected by the switcher 108. These two series connected delay circuit portions are connected between the input terminal 104 and two fixed contacts of a switch 109. By means of this switch 109, either one of said two series connected delay circuit portions is derived selectively and is applied to an output terminal 909 through the continuously variable delay circuit 910.

Each switching element of said switchers 105, 106, 107 and 108 may consist of a gate circuit. The gate circuits are suitably controlled by gate pulses produced in relation to phase differences between the reference synchronizing signals and the synchronizing signals of the input signal, so that the gate circuits of each switcher are selectively opened so as to obtain delay times corresponding to said phase differences. Compensation of time error shorter than t can be effected by the continuously variable delay circuit 910. In this manner, by carrying out the control in relation to the phase difference between the input and output signals, the time error compensated signal can be obtained from the output terminal 909. As the continuously variable delay circuit 910, a well-known AMTEC delivered from the AMPEX Company, U.S.A., may be used, so that its construction and operation need not be explained herein.

As shown in FIG. 1, the output signal from the time error compensator 10 is fed to a next interlace interpolator 11. As explained above, in the field setter 8, the H/2-delay line is switched at a rate of five field periods in order to maintain the interlace relation of the output signal from the field converter 9. By means of such field setting, the weight position in the picture moves up and down by an amplitude corresponding to H/2 at a repetition rate of said switching period. The interlace interpolation is to compensate for such up and down movement of the weight position in the picture. In order to effect such a compensation, adjacent scanning lines are added with weighting in the similar manner as described in the aforementioned line interpolator 5 so that the weight position comes to a middle point between two adjacent scanning lines. Ratios for this weighted addition will now be explained with reference to a chart shown in FIG. 12.

Figure 12:
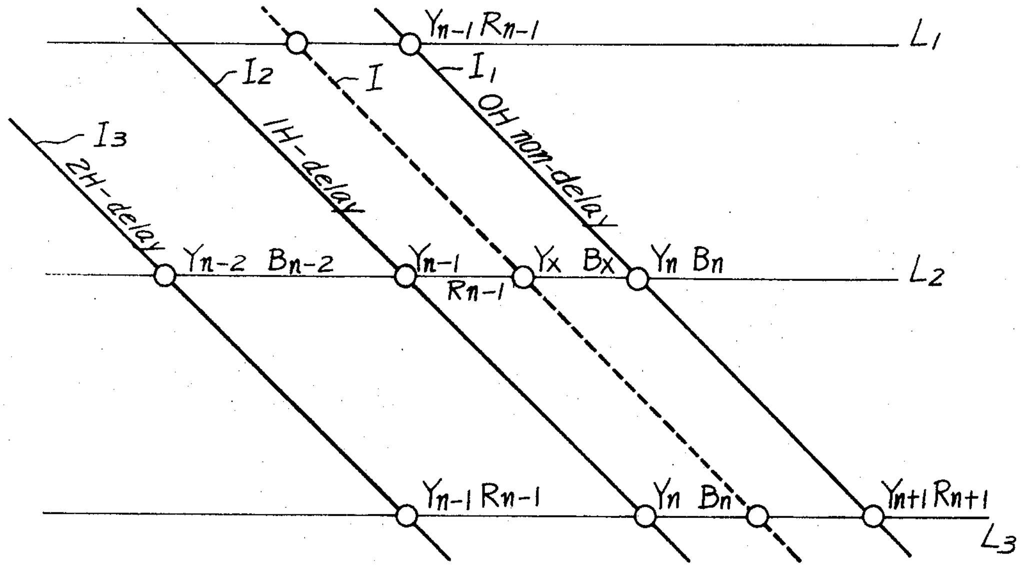
FIG. 12 is an explanatory diagram of interlace interpolation.

In FIG. 12, lateral lines, $L_1$, $L_2$, $L_3$ represent the successive horizontal scanning lines. Luminance and chrominance signals of an oblique straight line $I_1$ in the picture on arbitrary scanning lines $L_1$, $L_2$ and $L_3$ are denoted as $Y_{n-1}$, $B_{n-1}$; $Y_n$, $B_n$ and $Y_{n+1}$, $B_{n+1}$, respectively. Oblique lines $I_2$ and $I_3$ parallel to the oblique line $I_1$ are obtained by delaying the oblique line $I_1$ by 1H and 2H periods, respectively. Thus, the signals $Y_{n-1}$, $B_{n-1}$; $Y_n$, $B_n$; $Y_{n+1}$, $B_{n+1}$ on these lines $I_2$ and $I_3$ are situated at positions below the line $I_1$ by heights corresponding to 1H and 2H periods. In order to avoid the up and down movement of the weight position in the picture, the adjacent scanning lines are added with weighting at a suitable ratio corresponding to an oblique dotted line I. That is to say, for the luminance signal $Y_x$, the following weighted addition is carried out;

$$Y_x = 0.5Y_{n-1} + 0.5Y_n.$$

For the chrominance signal $C_x$, since the same kind of the color difference signal is transmitted on each two lines, the following weighted addition is effected;

$$C_x = 0.25B_{n-2} + 0.75B_n.$$

These weighted additions are effected in relation to the switching period of the H/2-delay line 81 in the field setter 8.

Figure 13:
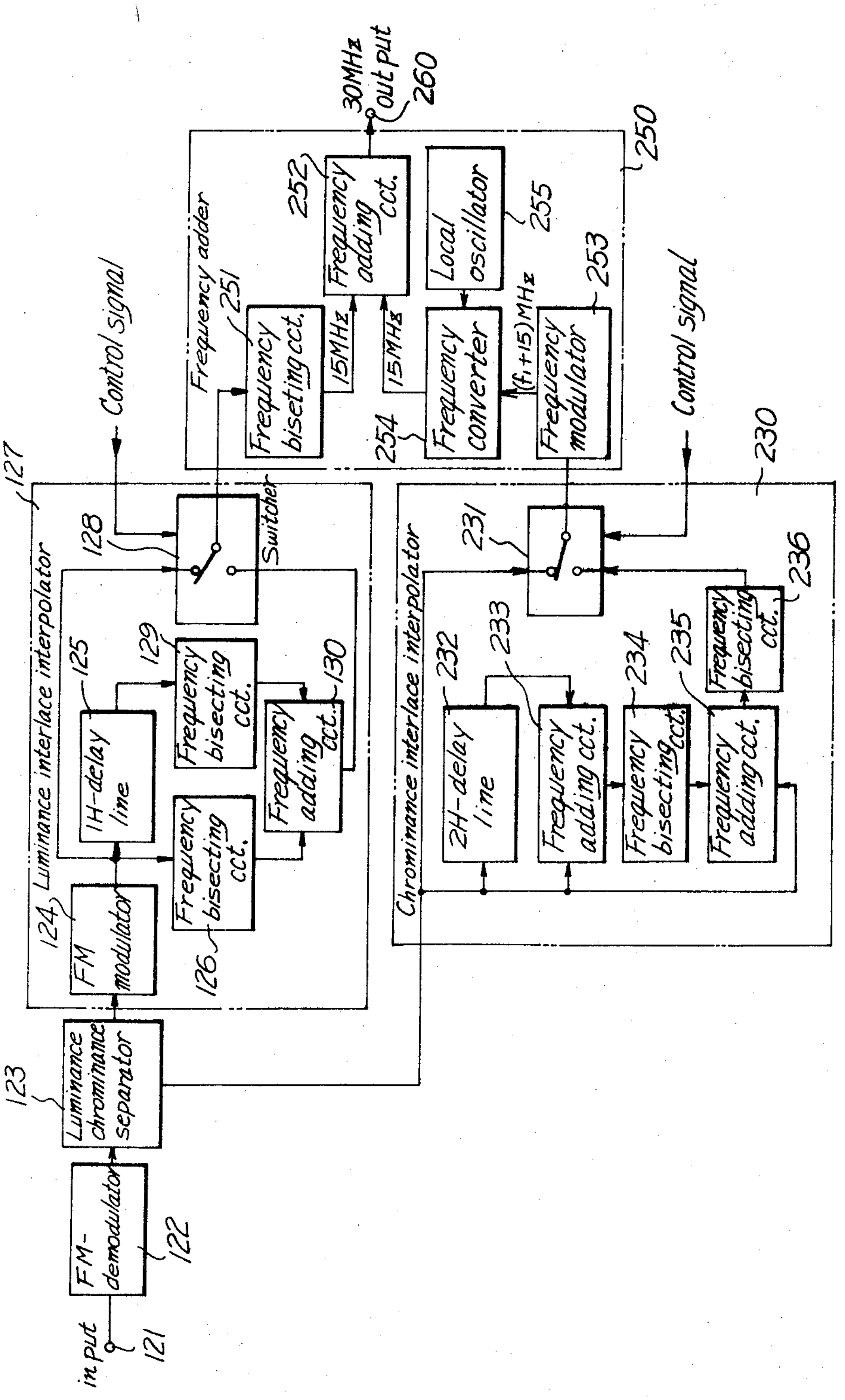
FIG. 13 is a block diagram of the interlace interpolator.

FIG. 13 shows an embodiment of the interlace interpolator 11. In FIG. 13, the input signal applied to an input terminal 121 is supplied through an FM demodulator 122 to a luminance-chrominance separator 123 so as to be separated into the luminance signal and the FM color difference signal (carrier chrominance signal). The luminance signal is fed to a luminance signal interlace interpolator 127. In the luminance signal interlace interpolator 127, the luminance signal is first applied to an FM modulator 124. In the FM modulator 124, the luminance signal is converted into an FM signal having a frequency band of, for example, 30 MHz, which is suitable for obtaining better transmitting efficiency for the luminance signal passing through delay lines. The construction of the luminance-chrominance separator 123 is entirely the same as that of the luminance-chrominance separator 51 in the line interpolator 5 shown in FIG. 2, so that the luminance-chrominance separator 123 is not explained here.

The FM luminance signal from the FM modulator 124 is fed to an 1H-delay line 125, a frequency bisecting circuit 126 and a switcher 128 which is switched in relation to the operation of the field setter 8. Non-delayed signal and 1H-delayed signal derived from the input and output terminals of the 1H-delay line 125, respectively are fed to the frequency bisecting circuits 126 and 129, respectively, wherein the frequency of the non-delayed and 1H-delayed signals is lowered by two. The output signals from the frequency bisecting circuits 126 and 129 are supplied to a frequency adding circuit 130. From the output terminal of the frequency adding circuit 130, there can be derived a weighted addition signal having the frequency band of 30 MHz, which signal is equivalent to a signal obtained by adding with weighting adjacent scanning lines at a ratio of 0.5/0.5. The weighted addition signal thus obtained and the non-delayed signal from the FM modulator 124 are fed to a frequency adder 250 through the switcher 128.

The FM color difference signal separated in the luminance-chrominance separator 123 is fed to a chrominance signal interlace interpolator 230. The chrominance signal interlace interpolator 230 comprises a switcher 231 which is operated in synchronism with said switcher 128. The switcher 231 is so operated that a non-weighted addition signal can be derived during a time period in which the same field is repeated twice, while the weighted addition signal can be derived during the remaining time period.

The manner of producing weighted addition signals in the luminance and chrominance signal interlace interpolators 127 and 230 is entirely same as that in the luminance and chrominance signal line interpolators 52 and 53 shown in FIG. 2, so that the operation of the luminance and chrominance signal interlace interpolators 127 and 230 is not explained in detail.

In FIG. 13, the reference numeral 232 denotes a 2H-delay line, 233 and 235 denote frequency adding circuits and 234 and 236 denote frequency bisecting circuits.

The output signals derived from the switchers 128 and 231 are fed to the frequency adder 250 and converted into an FM-SECAM signal having a frequency band of 30 MHz. The FM-SECAM signal is derived from an output terminal 260. The FM luminance signal of 30 MHz frequency band derived from the luminance signal interlace interpolator 127 is converted into an FM signal of 15 MHz frequency band by a frequency bisecting circuit 251 and then the 15 MHz FM signal is fed to a frequency adding circuit 252. The FM color difference signal derived from the chrominance signal interlace interpolator 230 is converted into an FM-FM signal having a frequency band of ($f_1$+15) MHz by a frequency modulator 253 and the FM-FM signal is applied to a frequency converter 254. To the frequency converter 254, a signal of $f_1$ MHz is applied from a local oscillator 255. Thus, the FM-FM signal of ($f_1$+15) MHz band is converted into an FM-FM signal of 15 MHz band. This FM-FM signal of 15 MHz band is applied to the frequency adding circuit 252. In the frequency adding circuit 252, the FM-FM signal of 15 MHz band is added on a frequency axis with the FM luminance signal of 15 MHz band so as to produce an FM-SECAM signal having a frequency band of 30 MHz.

The output signal from the interlace interpolator 11 is fed to a next field interpolator 12 (see FIG. 1). In the field interpolator 12, the discontinuity in the field resulting from increasing the number of fields in the field converter 9 is compensated.

Figure 14:
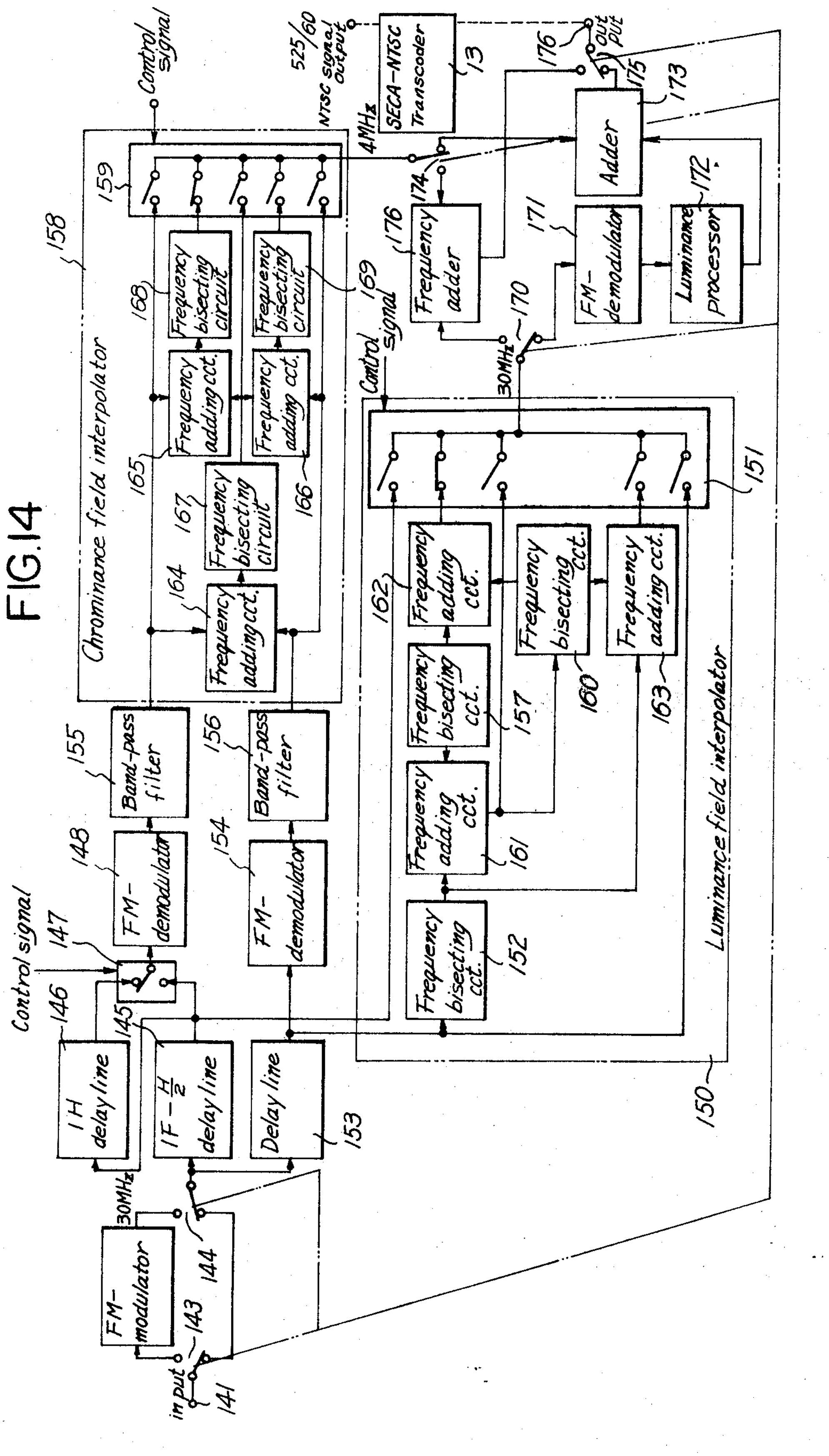
FIG. 14 is a block diagram of the field interpolator.

FIG. 14 shows an embodiment of the field interpolator 12. As shown in FIG. 14, the input signal applied to an input terminal 141 from the interlace interpolator 11 is divided into two through switchers 143 and 144 which are so operated to short-circuit an FM-modulator 142. One of the divided input signals is passed through a (1F−H/2) delay line 145, a 1H-delay line 46 and a switcher 147 which is operated at a switching rate equal to twice the switching rate of the field setter 8 to an FM-demodulator 148. The delay lines 145, 146 and switcher 147 constitute a delay circuit which gives to the input signal alternatively delay times of (1F−H/2) and (1F+H/2) at said switching rate. The output signal from the (1F−H/2) delay line 145 is also applied to a luminance signal field interpolator 150.

The other half of the divided input signals is fed to the luminance signal field interpolator 150 and at the same time to an FM demodulator 154 through a delay line 153 for matching the timing. In the FM demodulators 148 and 154, the input signals of 30 MHz band are demodulated and the demodulated signals are passed through separate band-pass filters 155 and 156 so as to derive FM color difference signals. The FM color difference signals thus derived are supplied to a chrominance signal field interpolator 158.

The construction of the luminance signal and chrominance signal field interpolators 150 and 158 is the same as that of the luminance signal and chrominance signal line interpolators 52 and 53 shown in FIG. 2, except for the point that in the field interpolators 150 and 158 each switcher is operated at a rate in relation to the field period F of the second color television signal. Therefore, the field interpolators 150 and 158 need not be explained here in detail. It should be noted that the color sequence of the input signal is different between adjacent fields, so that in the chrominance signal field interpolator 158, in order to identify phase of the line signal of the same kind of color difference signal, phase of one kind of the color difference signal supplied to the chrominance field interpolator 158 is delayed by H/2 by means of the switcher 147.

In FIG. 14, the reference numerals 152, 157, 160, 167, 168 and 169 denote frequency bisecting circuits, 161, 162, 163, 164, 165 and 166 denote frequency adding circuits and 151 and 159 denote switchers for selectively deriving the field signal added with weighting in a frequency axis.

The output signal derived from the switcher 151 is applied to an FM demodulator 171 through a switcher 170. The luminance signal thus demodulated is applied to an adder 173 through a luminance signal processor 172.

The FM color difference signal derived through a switcher 174 is also applied to the adder 173 and is added with the luminance field signal therein to produce a SECAM signal. This SECAM signal is applied through a switcher 175 to an output terminal 176.

In this manner, the 625/50 SECAM signal has been converted into the 525/60 SECAM signal. When a 525/60 NTSC signal is required as a finally converted signal, a wellknown SECAM-NTSC transcoder 13 may be connected to the output terminal 176 of the field interpolator 12. Then from the SECAM-NTSC transcoder 13, 525/60 NTSC signal can be derived.

It should be noted that in order to obtain the actual SECAM signal, the color sequence of the FM color difference signal applied to the adder 173 should be reversed each twelve fields, i.e., 8th – 19th fields as shown in the column F of the chart shown in FIG. 10. On the contrary, when NTSC signal is required, in the SECAM-NTSC transcoder 13, the line sequence chrominance signal must be converted into the simultaneous chrominance signal by a line switch upon demodulating the chrominance signal.

In case of converting the 625/50 SECAM or PAL color television signal into 525/60 NTSC color television signal, the following fact should be taken in account with respect to the sub-carrier frequency. In the standards of the NTSC signal, the field frequency is actually 59.94 Hz and the line frequency is 15,734 Hz, while in the converting equipment of the present embodiment, the field frequency is chosen to 60 Hz and the line frequency is chosen to 15,750 Hz. Therefore, a frequency near the NTSC sub-carrier frequency of 3.58 MHz and interleaving with said line frequency of 15,750 Hz is 3.567375 MHz or 3.583125 MHz. However, if such frequencies are used as the sub-carrier frequency, usual NTSC color television receivers might not obtain the correct color synchronism. The inventors have found that when the sub-carrier frequency is chosen to be 3.579540 MHz, NTSC dot interference could be avoided and since the frequency 3.579540 MHz differs by only 5 Hz from the actual NTSC subcarrier frequency, usual NTSC color television receivers could easily retain the color synchronization and the reproduction quality of the color picture is not degraded. Therefore, in the SECAM-NTSC transcoder 13, the sub-carrier frequency to be added is chosen to be 3.579540 MHz.

The converting equipment according to the present invention comprises a number of delay lines as main constructional elements. For the delay lines having short or fine delay times such as the delay time $t$ used in the time error compensator 10, balanced stranded-cables may be used. For the delay lines having relatively long delay times such as the delay times 1H′, 0.5Δ, 1Δ, 2Δ, 4Δ, 8Δ, 16Δ, 34(H′+5Δ), 24(H′+5Δ), 10(H′+5Δ), 6(H′+5Δ), 3(H′+5Δ), 2(H′+5Δ), (H′+5Δ), H/2, (50H′+262.5Δ), etc., a delay line comprising a quartz delay line may be used. Once possible arrangement of such a quartz delay line is shown in FIG. 15.

Figure 15:
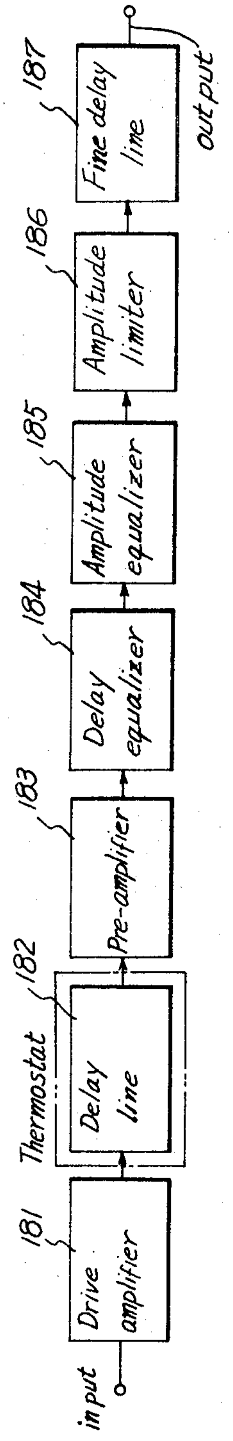
FIG. 15 is a practical embodiment of a delay line used for producing a long delay time.

As shown in FIG. 15, the present quartz delay line comprises a drive amplifier 181, a quartz delay element 182 arranged in a thermostat, a pre-amplifier 183, a delay equalizer 184 consisting of a cascade connection of all-pass filters to effect the delay equalization in a stagger manner, an amplitude equalizer 185, an amplitude limiter 186 and a fine delay line 187 consisting of a balanced cable for adjusting a fine delay time. The quartz delay line having such a construction has been known in the art, so that further detailed explanation need not be required.

Now an embodiment of the switcher used in the converting equipment according to the present invention will be described with reference to FIG. 16.

Figure 16:
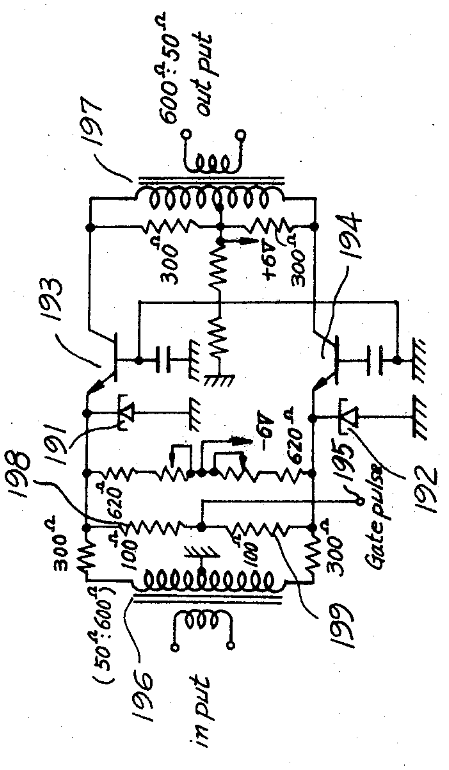
FIG. 16 is a circuit diagram of an embodiment of the switcher element for a 30 MHz frequency band FM signal.

As shown in FIG. 16, tunnel diodes 191 and 192 are connected between emitters of the transistors 193 and 194 and the earth, respectively. These tunnel diode-transistor pairs are connected in push-pull mode between an input transformer 196 and an output transformer 197. The gate pulse is applied to junction points of the emitters of the transistors 193 and 194 and the cathodes of the tunnel diodes 191 and 192 through resistors 198 and 199, respectively. When the gate pulse is not applied, the transistors 193 and 194 are biased in the non-conductive condition, so that the input signal applied to the input transform 196 is not transmitted to the output transformer 197. On the other hand when the gate pulse is applied, the transistors 193 and 194 are biased in the conductive condition and they conduct current alternatively in the push-pull mode. By means of such switcher the switching speed shorter than several nano-seconds may be obtained.

So far the embodiment of the converting equipment according to the invention has been described for converting the first color television signal of 625/50 standards into the second color television signal of 525/60 standards. One of the features of the converting equipment according to the invention is to carry out a conversion in the reverse direction. In case of the conversion in the reverse direction, the first color television signal of 525/60 standards is passed through the successive stages in the reverse direction in contradistinction with the above described forward conversion. However, in the reverse conversion, since the number of fields must be reduced, the interlace interpolation need not be effected and only the connecting point of the time error compensator 10 is changed as compared with the forward conversion.

Figure 17:
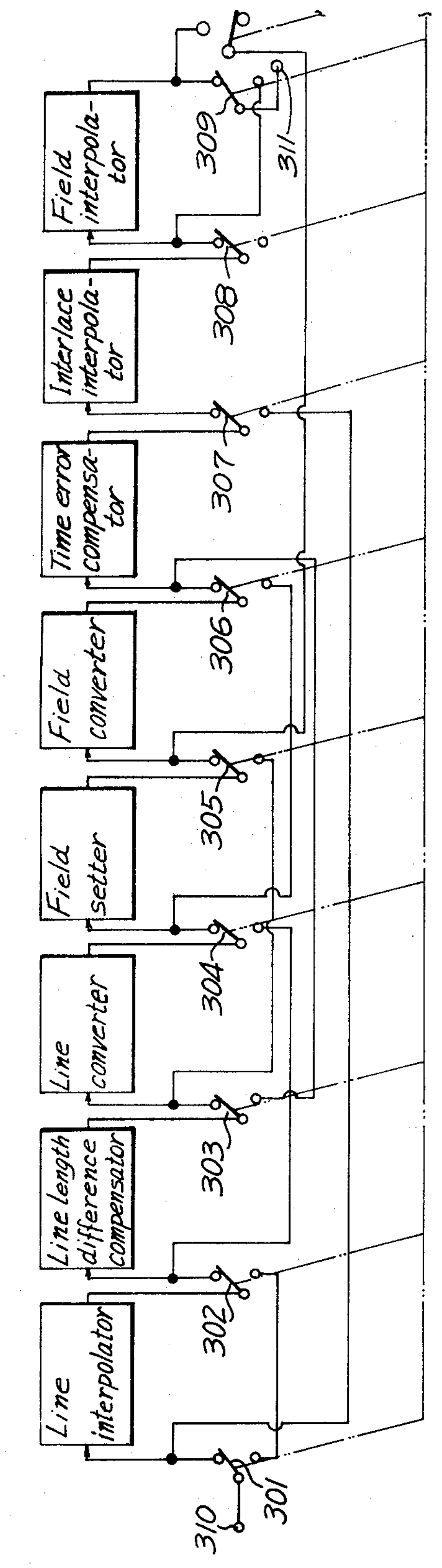
FIG. 17 is a block diagram showing an embodiment of the system of the present invention which can be used for both, forward (625/50 → 525/60) conversion and reverse (525/60 → 625/50) conversion by switching the system.

FIG. 17 shows an embodiment of the converting equipment according to the invention in which the forward and reverse conversion can be selectively effected by switching switchers 301, 302, 303, 304, 305, 306, 307, 308 and 309. In the position of the switchers shown in FIG. 17, the forward conversion can be effected.

A terminal 310 serves as an input terminal for the SECAM first color television signal in case of the forward conversion and also serves as an output terminal for the converted second color television signal in case of the reverse conversion. A terminal 311 serves as an output terminal in case of the forward conversion and also serves as an input terminal in case of the reverse conversion.

In case of the reverse conversion, the switchers 302 – 309 are switched to positions opposite to those shown in the drawing, so that the first color television signal to be converted is applied to the terminal 311 and then passes successively through the field interpolator 12, the field converter 9, the field setter 8, the line converter 7, the line length difference compensator 6, the time error compensator 10 and the line interpolator 5. The converted second color television signal can be derived from the terminal 310. The switchers 301 –309 are operated in synchronism with the switchers 143, 144, 174 and 175 in the field interpolator 12 shown in FIG. 14. That is the input terminal 141 of the field interpolator 12 shown in FIG. 14 is connected to the terminal 311 shown in FIG. 17 and to the input terminal 141 is applied the SECAM color television signal of 525/60. This input signal is applied to the FM modulator 142 through the switcher 143 and is converted into an FM signal having a frequency band of, for example, 30 MHz. This FM signal derived from the switcher 144 is separated into the luminance signal and the FM color difference signal. As described above in case of the forward conversion, in the luminance and chrominance signal field interpolators 150 and 158, the weighted addition signals are produced on a frequency axis at suitable ratios for compensating for the discontinuity of the field signal caused by the field conversion from six fields to five fields.

The weighted addition signals thus obtained are applied to the frequency adder 176 having the same construction as that of the frequency adder 250 shown in FIG. 13, through the switchers 170 and 174 operated in synchronism with the switchers 301 – 309. The FM-SECAM signal of the 30 MHz band derived from the frequency adder 176 is supplied through the switcher 175 to the output terminal 176 and is further applied to the next field converter 9. It is apparent that the switcher 175 is also operated in synchronism with the switchers 301 – 309. The construction and the operation of the frequency adder 176 and the field interpolator have been already explained in relation to the forward conversion and are not explained here.

The output signal from the output terminal 175 is then processed successively in the field converter 9, the field setter 8, the line converter 7, the line length difference compensator 6, the time error compensator 10 and the line interpolator 5. The construction and operation of these stages have been already explained in the case of the forward conversion and are not described here. However, in this case the following points should be taken into account.

1. In the field converter 9, the number of fields is reduced from 60 to 50 by deleting one field from each five fields.

2. In the line converter 7, from each five lines of 250 lines except for the first 12.5 lines one line must be used twice.

3. In the line interpolator 5, the chrominance line interpolation is so effected that the color sequence is reversed at a rate of six line period, because in the line converter 7 the color sequence is reversed at a rate of six line period.

In the reverse conversion the SECAM signal of 525/60 standards applied to the input terminal 311 is converted in the above mentioned manner and the SECAM signal of 625/50 standards is derived from the output terminal 310. When it is required to obtain the NTSC or PAL signal, a known SECAM-NTSC or SECAM-PAL encoder may be connected to the output terminal 310.

Control signals for controlling the switching elements of the switchers may be obtained from any known pulse generating circuits by using output signals from a genlocked oscillator coupled to the first color television signal as reference signals.

As described above, in the converting equipment according to the present invention, it is not necessary to process the luminance signal and the chrominance signal separately in contradistinction to the known converting equipment so that the converting equipment of the invention can be constructed economically. Moreover, the main parts of the converting equipment consist of the delay lines, so that degradation of the quality of the picture is slight. Furthermore the variation of the hue is small, because each process is carried out for the SECAM signal. The converting equipment according to the present invention has further advantages in that the black and white television signal as well as the color television signal may be converted by the same equipment and both of the forward and reverse conversions can be easily effected.

What is claimed is:

1. A color television standard system converting equipment comprising a line interpolator, a line length difference compensator, a line converter, a field setter, a field converter and a field interpolator arranged in the above-mentioned sequence or reverse thereto between at least two sets of terminals, wherein;

a. the line interpolator comprises a luminance-chrominance separator for separating a luminance signal and an FM color difference signal from a SECAM type input first color television signal, a frequency modulator for modulating the luminance signal derived from said luminance-chrominance separator to obtain an FM signal in a frequency band suitable to transmit it through delay lines with desired transmission efficiency, a luminance line interpolator for making weighted addition at a desired ratio in the frequency domain between co-related two adjacent lines of the FM luminance signal obtained from said frequency modulator so as to obtain an interpolated luminance signal, a chrominance line interpolator for making weighted addition at a desired ratio in the frequency domain between two adjacent lines of the FM color difference signal of the same kind of color so as to obtain an interpolated chrominance signal, and a frequency adder for making frequency addition of the derived output signals from both interpolators to form an FM-SECAM type signal suitably transmitted through delay lines with high efficiency;

b. the line length difference compensator comprises a plurality of delay lines and is so arranged as to switch delay time with at least a delay time pitch corresponding to the difference between the line length (H') of the input first color television signal which is to be converted and the line length (H) of an output second color television signal;

c. the line converter comprises a plurality of delay lines each having a minimum delay unit having an amount of delay corresponding to H'+5(H'−H), wherein H' is the line period of the first color television signal and H is the line period of the second color television signal, and a switching circuit to which the delay lines to obtain a desired delay time in a pitch of the minimum delay time by combining the delay lines in a various manner;

d. the field setter comprises at least a H/2 delay line and a switcher for the setting field of in input signal to the field converter so as to obtain an interlaced scanning in the output signal from the field converter;

e. the field converter comprises a plurality of cascade connected delay lines having delay time corresponding to the difference between the field period of the incoming first color television signal and that of the desired second color television signal, and is so constructed as to vary the delay time corresponding to the field period of the second color television signal with pitches each corresponding to said difference between both field periods;

f. the field interpolator comprises delay means to alternately provide delay times corresponding to 1F ± H/2, wherein F is a field period of the second color television signal;

a luminance field interpolator for making weighted addition at the desired weight ratio of a delayed signal from the delay means and a non-delayed signal, a chrominance field interpolator for making weighted addition at the desired ratio of said delayed signal and non-delayed signal after the FM color difference signals are removed, and an adding circuit including means for demodulating an output signal from the luminance field interpolator to obtain a luminance signal thereafter to add the FM color difference signal thereto to form a SECAM type second color television signal.

2. A color television standard system converting equipment as claimed in claim 1, said converting equipment being suitable for converting a first color television standard system having a larger number of horizontal scanning lines into a second color television standard system having a smaller number of horizontal scanning lines, said converting equipment further comprising a time error compensator included between said field converter and said field interpolator and an interlace interpolator connected between said time error compensator and said field interpolator, wherein said time error compensator comprises a digital type variable delay circuit comprising a first tapped variable delay circuit having a long delay time for deriving separately two delayed signals having delay times of O − NT (where N is positive integer) at a step of a long delay time T, two sets of tapped variable delay circuit having a fine delay time for deriving separately two delayed signals by delaying said two delayed signals derived from said first tapped variable delay circuit by delay times of O − *nt* (wherein *n* is positive integer) at a step of a fine delay time t and a switcher for deriving either one of said delayed signals derived from said two sets of tapped variable delay circuits;

and wherein said interlace interpolator comprises an FM demodulator for demodulating in input FM signal applied thereto, a luminance-chrominance separator for deriving separately a luminance signal and FM color difference signals from said demodulated signal, a luminance signal interlace interpolator for deriving a signal by adding with weighting at a sultable ratio two adjacent lines in a frequency domain, after converting the luminance signal from said luminance-chrominance separator into an FM signal having a frequency band suitable for transmission through delay lines, said weight addition signal and non-weight addition signal being derived alternately at a desired rate, a chrominance signal interlace interpolator for deriving alternately a weight addition signal and non-weight addition FM color difference signals at a desired rate, said weight addition signal being derived by adding with weighting at a given ratio two adjacent lines of the same kind of the FM color difference signals supplied from said luminance-chrominance separator, and a frequency adder for adding in a frequency domain output signals from said both interlace interpolators so as to convert them into an FM signal having a frequency band suitable for transmission through delay lines.

3. A color television standard system converting equipment as claimed in claim 2, wherein said luminance signal interlace interpolator is so composed that two FM luminance signals are added in a frequency domain after the frequency of said two FM luminance signals are stepped down by 2 so as to obtain a weight addition signal having a weighting ratio of 0.5/0.5, and said chrominance signal interlace interpolator is so composed that a weight addition signal having a weighting ratio of 0.25/0.75 is obtained by adding two FM color difference signals in a frequency domain, stepping down the frequency of the resulted addition signal by 2, adding the resulting signal with one of said two FM color difference signals and then stepping down the frequency of the signal thus obtained by two.

4. A color television standard system converting equipment as claimed in claim 3, wherein said luminance signal line interpolator of said line interpolator and said luminance signal field interpolator of said field interpolator are so composed that weight addition signals having weighted ratios of 1/0, 0.75/0.25, 0.5/0.5, 0.25/0.75 and 0/1 are obtained by selectively deriving by means of a selecting switcher first and second FM signals, a third FM signal obtained by adding said first and second FM signals after the frequency of these FM signals is stepped down by 2, fourth and fifth FM signals obtained by adding in a frequency domain said third FM signal after its frequency is stepped down by 2 and said first and second FM signals after their frequency is stepped down by 2, said chrominance signal line interpolator and said chrominance signal field interpolator are so composed that weighted addition signals having weighting ratios of 1/0, 0.75/0.25, 0.5/0.5, 0.25/0.75 and 0/1 of first and second FM chrominance signals to be added are obtained selectively by selectively deriving by means of a selecting switcher said first and second FM color difference signals, a third FM color difference signal obtained by adding in a frequency domain said first and second FM color difference signals and then the frequency of the FM signal thus added being stepped down by 2, fourth and fifth FM color difference signals obtained by adding in a frequency domain said third FM color difference signal and said first and second FM color difference signals, respectively and then the frequency of thus added FM color signals being stepped down by 2.

5. A color television standard system converting equipment as claimed in claim 3, wherein said line length difference compensator comprises a plurality of delay lines having delay times equal to 0.5Δ, 1Δ, 2Δ, 4Δ, 8Δ and 16Δ, wherein Δ is equal to a difference in a horizontal scanning line length between the input first color television signal to be converted and the output second color television signal, these delay lines being connected in cascade with desired combination so as to decrease a composite delay time successively in such a manner that each input line signal applied to said line length difference compensator arrives at an output terminal thereof at a timing faster than a former input line signal by an amount of 0.5Δ.

6. A color television standard system converting equipment as claimed in claim 2 for converting a first color television standard system of 625 lines per frame and 50 fields per second into a second color television standard system of 525 lines per frame and 60 fields per second, wherein said line converter comprises a plurality of delay lines having delay times equal to (H'+5Δ), 2(H'+5Δ), 3(H'+5Δ), 6(H'+5Δ), 10(H'+5Δ), 20(H'+5Δ) and 34(H'+5Δ), wherein H' is a horizontal scanning line period of the input first color television signal and Δ is a line length difference between the first and second color television signals, these delay lines being connected into circuit in cascade with desired combination so that a delay time is reduced successively from 50H'+250Δ to 0Δ at a step of 1H'+5Δ so as to decrease a composite delay time successively in such a manner that each input line signal supplied to said line converter arrives at the output terminal thereof at a timing faster than a former input line signal by an amount of H'+5Δ and the output signal being composed of a 50H'+262.5Δ blank period and 262.5 lines each having 1H for each field period of the first color television signal.

7. A color television standard system converting equipment as claimed in claim 6, said field converter comprising five delay lines each having a delay time equal to 50H'+262.5Δ, these five delay lines being so connected that delay times of from 0 to 5(50H'+262.5Δ) are obtained at a step of 50H'+262.5Δ, the same field signal being derived twice with non-delay and 5(50H'+262.5Δ) delay so as to convert each successive five fields into six successive fields.

8. A color television standard system converting equipment as claimed in claim 1, said converting equipment further comprising a plurality of co-operated switchers, wherein by driving these switchers, the coupling sequence of a constructive element is severed.

9. A color television standard system converting equipment as claimed in claim 8, wherein said field interpolator comprises an FM modulator and the input color television signal to be converted is applied to said FM modulator and is converted into an FM signal having a frequency band suitable for transmission through delay lines and then being further supplied through delay means, a luminance field interpolator and an FM modulator.

10. A color television standard system converting equipment as claimed in claim 9, wherein said switchers are so composed that a time error compensator is inserted between said line length difference compensator and the line interpolator in response to the switching operation of said switcher, wherein said time error compensator comprises a digital type variable delay circuit comprising a first tapped variable delay circuit having a long delay time for deriving separately two delayed signals having delay times of 0 NT (where N is positive integer) at a step of a long delay time T, two sets of tapped variable delay circuits having a fine delay time for deriving separately two delayed signals by delaying said two delayed signals derived from said first tapped variable delay circuit by delay times of 0 nt (wherein n is positive integer) at a step of a fine delay time t and a switcher for deriving either one of said delayed signals derived from said two sets of tapped variable delay circuits.

* * * * *